United States Patent
Lim et al.

(10) Patent No.: US 8,553,593 B2
(45) Date of Patent: Oct. 8, 2013

(54) APPARATUS AND METHOD FOR PERFORMING COMMUNICATION USING FRAME STRUCTURE SUPPORTING H-FDD OPERATION

(75) Inventors: Dong Guk Lim, Gyeonggi-do (KR); Sung Ho Moon, Gyeonggi-do (KR); Han Gyu Cho, Gyeonggi-do (KR); Yeong Hyeon Kwon, Gyeonggi-do (KR); Jin Sam Kwak, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 296 days.

(21) Appl. No.: 12/817,935

(22) Filed: Jun. 17, 2010

(65) Prior Publication Data

US 2011/0013543 A1    Jan. 20, 2011

Related U.S. Application Data

(60) Provisional application No. 61/218,038, filed on Jun. 17, 2009, provisional application No. 61/236,158, filed on Aug. 24, 2009, provisional application No. 61/236,543, filed on Aug. 25, 2009.

(30) Foreign Application Priority Data

Apr. 7, 2010    (KR) .................. 10-2010-0031713

(51) Int. Cl.
  H04J 1/00      (2006.01)
  H04W 4/00      (2009.01)
(52) U.S. Cl.
  USPC .......................................... 370/281; 370/329
(58) Field of Classification Search
  None
  See application file for complete search history.

(56) References Cited

U.S. PATENT DOCUMENTS

2009/0185632 A1*    7/2009    Cai et al. .................. 375/260

FOREIGN PATENT DOCUMENTS

WO    WO 2008/046204 A1    4/2008
WO    WO 2009/051455 A2    4/2009

OTHER PUBLICATIONS

Gal et al., Proposed Harmonized OFDMA FDD/H-FDD Frame Structure Text changes for IEEE 802.16Rev2/D4, May 15, 2008, IEEE C802.16maint-08/217 r1, all pages.*
Hamiti, "The Draft IEEE 802.16m System Description Document", IEEE 802.16 Broadband Wireless Access Working Group <http://ieee802.org/16>, IEEE 802.16m-08/003r3, pp. 1-55, Jun. 16, 2008.
Lomnitz et al., "Definitions for H-FDD mode in OFDMA", IEEE 802.16 Broadband Wireless Access Working Group <http://ieee802.org/16>, IEEE C802.16maint-04/11r2, pp. 1-5, Nov. 1, 2004.

* cited by examiner

*Primary Examiner* — Chirag Shah
*Assistant Examiner* — Srinivasa Reddivalam

(57) ABSTRACT

A method for performing communication using a frame structure that supports a half-frequency division duplex (H-FDD) operation and a device using the same are disclosed. A base station performs resource allocation scheduling to support H-FDD user equipment operation in a mobile communication system. For example, the base station allocates first, second and last uplink subframes for idle subframes within a specific frame or punctures them, so that the H-FDD user equipment does not use the uplink subframes. The base station transmits the scheduled resource allocation information to the user equipment through a superframe header, a preamble and a MAP. The user equipment which has received the scheduled resource allocation information (subframe index and location that can be used by the user equipment) transmits and receives a signal based on the resource allocation information.

12 Claims, 16 Drawing Sheets

APPARATUS AND METHOD FOR PERFORMING COMMUNICATION USING FRAME STRUCTURE SUPPORTING H-FDD OPERATION

Pursuant to 35 U.S.C. §119(e), this application claims the benefit of priority to Provisional Application No. 61/218,038, filed on Jun. 17, 2009, 61/236,158, filed on Aug. 24, 2009, 61/236,543, filed on Aug. 25, 2009, the contents of which are incorporated by reference herein in their entirety.

Pursuant to 35 U.S.C. §119(e), this application claims the benefit of priority to Korean application No. 10-2009-0031713, filed on Apr. 7, 2010, the contents of which are incorporated by reference herein in their entirety.

BACKGROUND OF THE INVENTION

1. Field of the Invention

The present invention relates to a mobile communication system, and more particularly, to a method for performing communication using a frame structure supporting H-FDD operation and a device using the same.

2. Discussion of the Related Art

An IEEE 802.16m system can support both a frequency division duplex (FDD) scheme that includes a half-frequency division duplex (H-FDD) user equipment operation and a time division duplex (TDD) scheme. The IEEE 802.16m system uses an orthogonal frequency division multiplexing access (OFDMA) as a multiplex access mode in a downlink and an uplink.

Hereinafter, a frame structure of the IEEE 802.16m system will be described in brief.

FIG. 1 is a diagram illustrating a structure of a basic frame in an IEEE 802.16m system.

Referring to FIG. 1, each superframe of 20 ms includes four same sized radio frames of 5 ms, and starts with a superframe header (SFH). If any one of channel bandwidths 5 MHz, 10 MHz, and 20 MHz is provided, each radio frame of 5 ms includes eight subframes. One subframe can be allocated for downlink or uplink transmission. The subframes can be defined in such a manner that the first type subframe includes six OFDMA symbols, the second type subframe includes seven OFDMA symbols, and the third type subframe includes six OFDMA symbols.

The basic frame structure can be applied to both the FDD scheme and the TDD scheme including H-FDD user equipment operation. In the TDD system, two switching points exist at each radio frame. The switching points can be defined in accordance with directional variation from the downlink to the uplink or from the uplink to the downlink.

The H-FDD user equipment can be included in the FDD system, and a frame structure is similar to a TDD frame structure in view of the H-FDD user equipment. However, downlink and uplink transmission occurs at two separate frequency bandwidths. Transmission gaps between the downlink and the uplink are required for switching of transmitting and receiving circuits.

FIG. 2 is a diagram illustrating an example of an FDD frame structure for channel bandwidths of 5 MHz, 10 MHz, and 20 MHz and having a CP length corresponding to ⅛ of a useful symbol length.

Referring to FIG. 2, a base station that supports an FDD scheme can support a half-duplex user equipment and a full-duplex user equipment at the same time, wherein the half-duplex user equipment and the full-duplex user equipment are operated using the same radio frequency (RF) carrier. A user equipment that supports an FDD scheme should use any one of H-FDD scheme and FDD scheme. For both downlink transmission and uplink transmission, all subframes can be used. Downlink and uplink transmission can be divided in a frequency domain. One superframe is divided into four frames, wherein one frame includes eight subframes.

As described above, the IEEE 802.16m system should support both the H-FDD scheme and a full-frequency division duplex (F-FDD) scheme. However, an FDD frame structure for improving system throughput to the maximum range has not been suggested until now.

SUMMARY OF THE INVENTION

Accordingly, the present invention is directed to a method for performing communication using a frame structure supporting H-FDD operation, which substantially obviates one or more problems due to limitations and disadvantages of the related art.

An object of the present invention is to provide a method for performing communication at a user equipment using a frame structure that supports a half-frequency division duplex (H-FDD) operation.

Another object of the present invention is to provide a method for performing communication at a base station using a frame structure that supports a half-frequency division duplex (H-FDD) operation.

Still another object of the present invention is to provide a user equipment device that uses a frame structure to support a half-frequency division duplex (H-FDD) operation.

Further still another object of the present invention is to provide a base station device that uses a frame structure to support a half-frequency division duplex (H-FDD) operation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for performing communication at a mobile station in a mobile communication system by using a frame structure that supports a half-frequency division duplex (H-FDD) operation comprises receiving resource allocation information to schedule transmission or reception of the mobile station from a base station, and performing communication using the allocated one or more subframes except idle subframes.

The idle subframes include first, second and last uplink subframes in one uplink frame. Also, the idle subframe further include downlink subframes corresponding to HARQ (Hybrid Automatic Repeat reQuest) timing of first, second, and last uplink subframes.

At this time, a superframe header or a preamble is received through a first downlink subframe corresponding to the same timing as that of the first uplink subframe in idle subframes.

In another aspect of the present invention, a method for performing communication at a base station of a mobile communication system to support a half-frequency division duplex (H-FDD) operation comprises scheduling resource allocation for a mobile station which uses the H-FDD frame structure, wherein the scheduled resource allocation is to provide idle subframes for receiving a superframe header (SFH) or A-Preamble and for securing a transition gap between transmission and reception; and transmitting the scheduled resource allocation information to the mobile station.

The idle subframes include first, second and last uplink subframes in one uplink subframe. Also, the idle subframes further include downlink subframes corresponding to HARQ (Hybrid Automatic Repeat reQuest) timing of first, second and last uplink subframes.

The method further comprises transmitting a signal to the mobile station through one or more other downlink subframes except the downlink subframes corresponding to HARQ (Hybrid Automatic Repeat reQuest) timing of first, second and last uplink subframes.

In still another aspect of the present invention, a mobile station (MS) for performing communication using a frame structure, which supports a half-frequency division duplex (H-FDD) operation in a mobile communication system, comprises a receiving module for receiving resource allocation information to schedule transmission or reception of the mobile station from a base station, wherein the resource allocation information is scheduled to provide idle subframes for receiving a superframe header(SFH) or A-Preamble and for securing a transition gap between transmission and reception; a processor for controlling to transmit or receive a signal through one or more other subframes except idle subframes based on the received resource allocation information; and a radio frequency (RF) unit for transmitting or receiving a signal through one or more other subframes except the subframes according to the control of the processor.

In further still another aspect of the present invention, a base station (BS) for performing communication in a mobile communication system to support a half-frequency division duplex (H-FDD) operation comprises a processor for scheduling resource allocation for a mobile station which uses the H-FDD frame structure, wherein the scheduled resource allocation is to provide idle subframes for receiving a superframe header(SFH) or A-Preamble and for securing a transition gap between transmission and reception; and a transmitting module for transmitting the scheduled resource allocation information to the mobile station.

According to the present invention, it is possible to support the operation of the H-FDD mobile station without any impact on the F-FDD frame structure. Accordingly, in the F-FDD frame structure, system throughput can be improved significantly.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
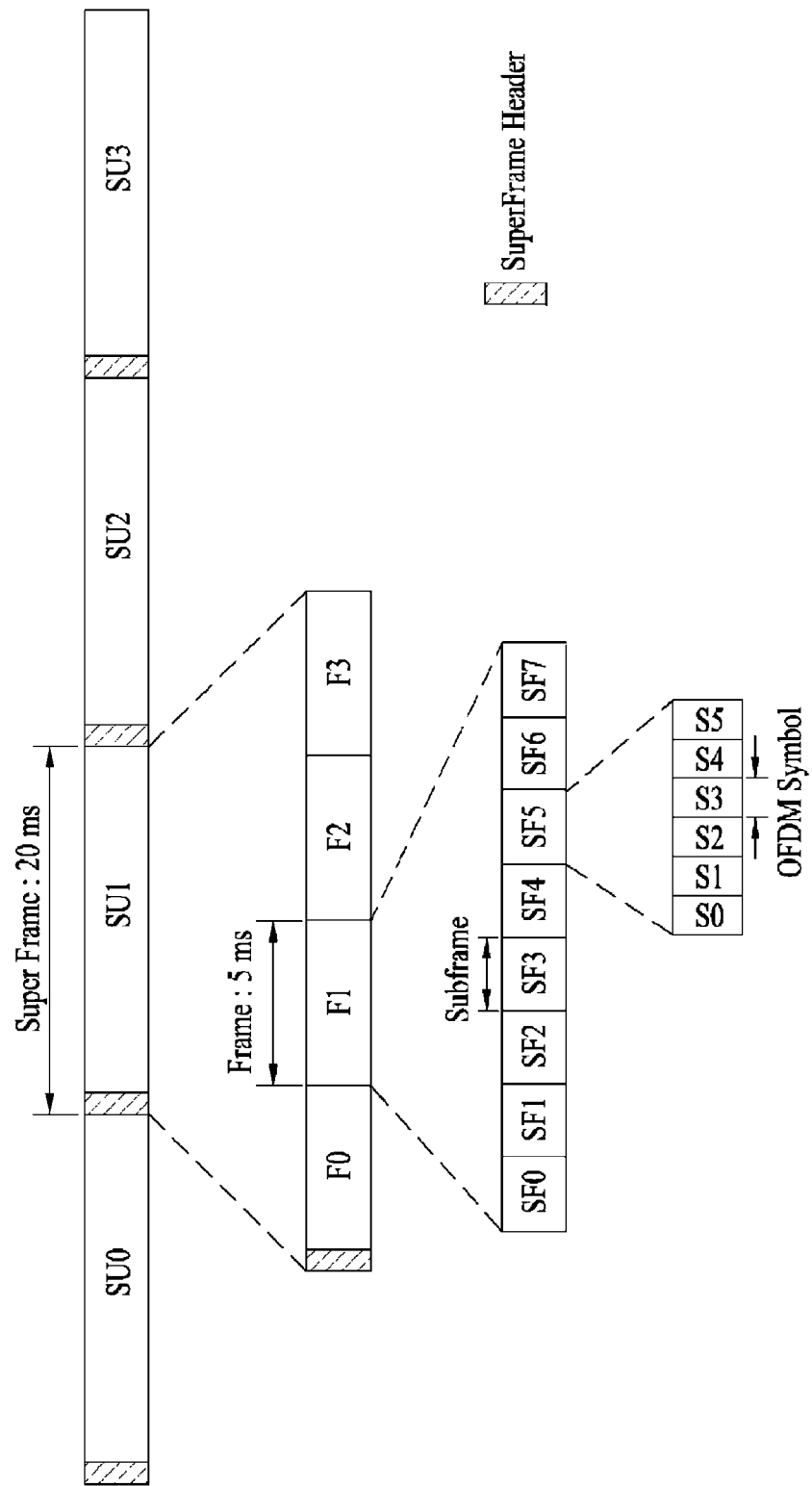
FIG. 1 is a diagram illustrating a structure of a basic frame in an IEEE 802.16m system.
Figure 2:
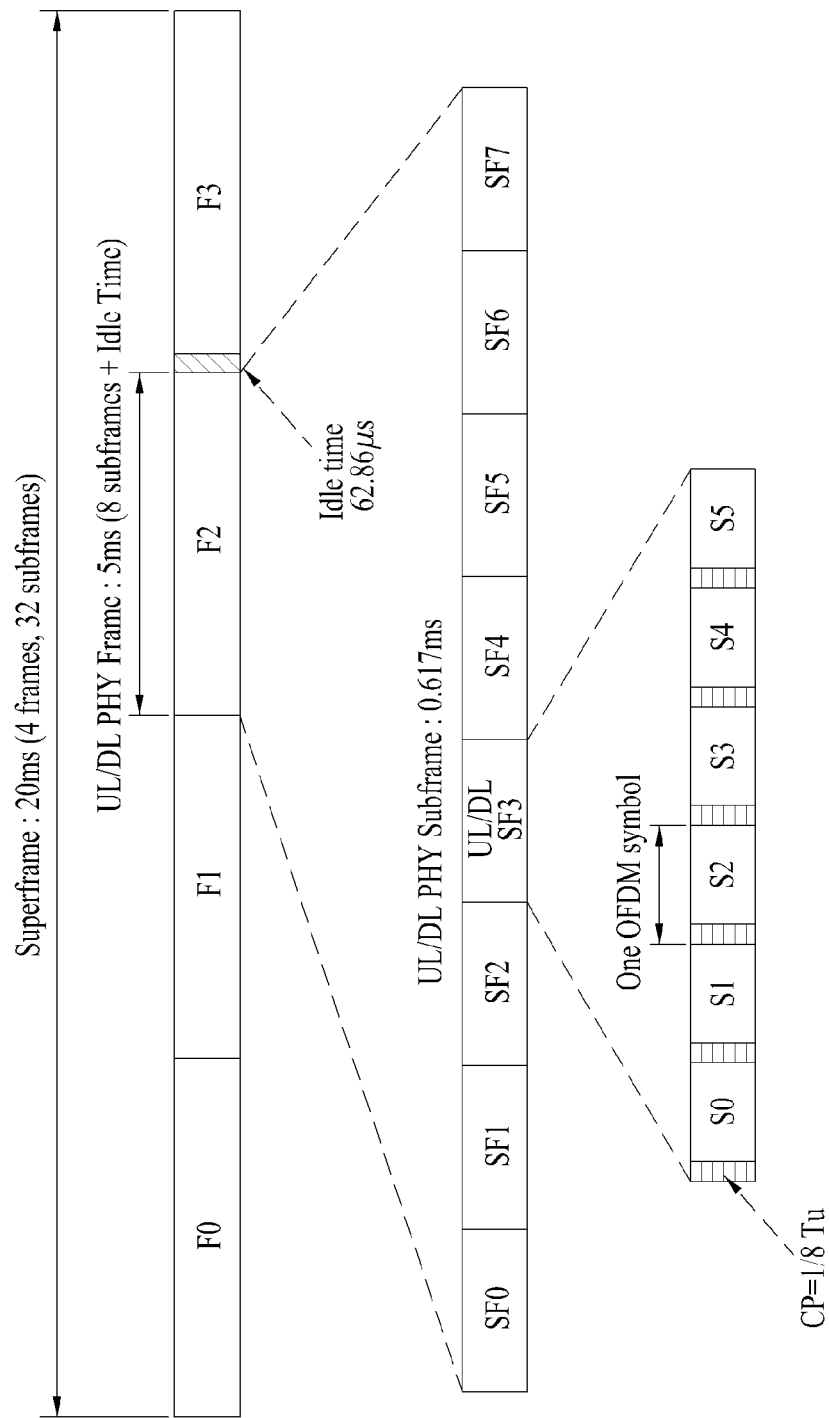
FIG. 2 is a diagram illustrating an example of an FDD frame structure for channel bandwidths of 5 MHz, 10 MHz, and 20 MHz and having a CP length corresponding to ⅛ of a useful symbol length.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on a mobile communication system corresponding to a 3GPP LTE system, the following description can be applied to other mobile communication systems except unique features of the 3GPP LTE system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Furthermore, in the following description, it is assumed that a user equipment designates a mobile or fixed type user terminal such as a mobile station (MS) and an advanced mobile station (AMS). It is also assumed that a base station designates a random node of a network node, such as Node B, eNode B and access point (AP), which performs communication with the mobile station.

In a mobile communication system, the user equipment can receive information from the base station through a downlink and transmit information to the base station through an uplink. Examples of information transmitted from or received in the mobile station include data and various kinds of control information. Various physical channels exist depending on types and uses of the information transmitted from or received in the mobile station.

The present invention describes an FDD frame structure for supporting an F-FDD user equipment, an H-FDD user equipment and a legacy H-FDD user equipment in an Advanced Air Interface (AAI) (for example, IEEE 802.16m) system, and a user equipment and a base station, which transmit and receive signals and data to and from each other using the FDD frame structure. The advanced air interface system described herein is only exemplary, and there is no limitation in the type and definition of the system. In the AAI system, a frame structure for supporting an H-FDD user equipment can be configured based on an FDD frame structure defined in the IEEE 802.16m.

The base station can perform resource allocation scheduling to support an operation of an half-frequency division duplex (H-FDD) user equipment in the mobile communication system. For example, the base station can perform scheduling in such a manner that it allocates a first uplink subframe, a second uplink subframe and the last uplink subframe to an idle subframe in a specific frame or puncture them, whereby the H-FDD user equipment does not use these uplink subframes. In other words, the base station may allocate an idle time for downlink/uplink switching in a subframe unit. The base station may transmit resource allocation information scheduled as above to the user equipment through a superframe header, a preamble, MAP information, and the like. The user equipment which has received the scheduled resource allocation information (available subframe index, subframe location, etc. may be included.) can transmit and receive signals based on the resource allocation information.

Hereinafter, a method for allocating resources from a base station in a frame structure for supporting an operation of an H-FDD user equipment, a method for scheduling resource allocation at a base station in a frame structure for supporting an operation of an H-FDD user equipment, and a method for transmitting and receiving a signal from and to an H-FDD user equipment based on the resource allocation and scheduling will be described.

Figure 3:
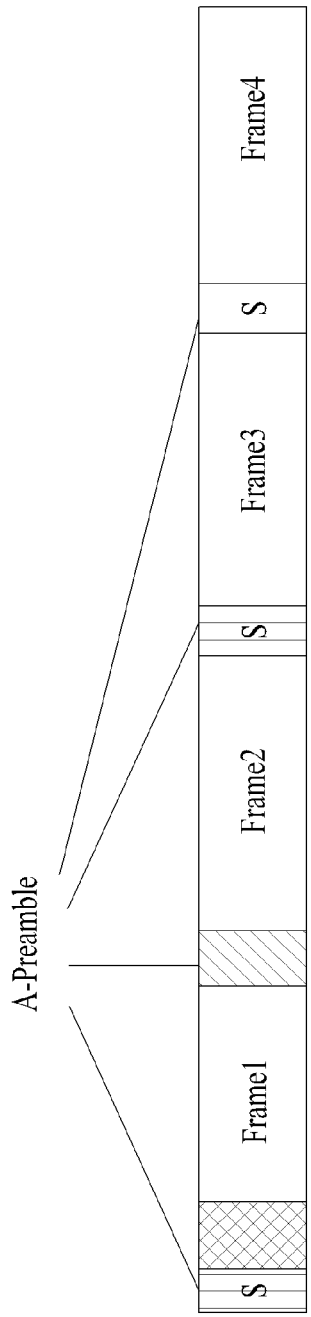
FIG. 3 is a diagram illustrating an example of a superframe structure in an AAI system.

FIG. 3 is a diagram illustrating an example of a superframe structure in an AAI system.

Referring to FIG. 3, in the frame structure of the IEEE 802.16m system, one superframe is divided into four frames, and data are transmitted to the user equipment in a superframe unit. Accordingly, the H-FDD frame structure can be configured by succeeding to the superframe structure which is previously defined. At this time, the user equipment needs to receive a significant signal (for example, superframe header (SFH) and Advanced-preamble (A-Preamble)) such as control information transmitted from the base station in the same manner as the existing superframe structure. The location of the significant signal transmitted from each frame within one superframe is as illustrated in FIG. 3.

The H-FDD user equipment needs to receive a superframe header, primary A-preamble, and secondary A-preamble, which are significant signals, from the base station regardless of the group belonging thereto. The user equipment may receive these signals through the first subframe of each frame as illustrated in FIG. 3. Accordingly, in order that the H-FDD user equipments belonging to each group receive all the significant signals transmitted from the base station, the H-FDD frame structure need to be configured in such a manner that the uplink frame zone allocates the first uplink subframe of each frame, to which the significant signals are transmitted, for an idle time or punctures it. If one subframe of each frame is punctured in the uplink zone through the above method, a problem occurs in that waste of resources is caused.

As another method for transmitting a significant signal such as control information to a H-FDD user equipment, the A-preamble transmitted from the third frame and the fourth frame in the superframe can be retransmitted as illustrated in FIG. 3 in the same manner as the A-preamble (secondary A-preamble) transmitted from the first frame. Since the H-FDD user equipment corresponding to each group should receive a superframe header (SFH) and A-preamble (primary A-preamble and secondary A-preamble) from the base station, it does not need to receive the same A-preamble transmitted from the third and fourth frames.

Accordingly, in order that the H-FDD user equipment receives a significant signal in the H-FDD frame structure, i.e., in order to receive a significant signal transmitted from the first and second frames of the superframe, the H-FDD frame structure may be configured in such a manner that the uplink subframe corresponding to same timing with the downlink subframe, to which the significant signal is transmitted, is allocated for an idle time or punctured. In this case, waste of resources can be more reduced than the case where the H-FDD frame is configured in such a manner that one subframe is allocated for an idle time or puncture the subframe in all the frames. However, the H-FDD user equipments belonging to group 2 fail to receive the significant signal (secondary A-preamble) via the third and fourth frames, whereby communication throughput may be deteriorated.

In this case, although the H-FDD user equipments belonging to the group 1 can receive all the significant signals transmitted in the superframe by receiving the A-preamble transmitted from the third and fourth frames, the H-FDD user equipments belonging to the group 2 fail to receive the A-preamble through the third and fourth frames, whereby unfairness between the groups may occur in receiving significant signals. In order to solve such unfairness, in addition to the case where the first subframe of the second frame is allocated for an idle time or punctured, switching between the groups at the third or fourth frame is additionally performed, whereby unfairness in receiving the significant signals can be solved.

For example, if group switching is used at the fourth frame, for the H-FDD frame structure at the first, second and fourth frames in FIG. 3, the downlink allocates downlink/uplink frames in the order of group 1 and group 2 while the uplink allocates downlink/uplink frames in the order of group 2 and group 1. However, at the third frame in FIG. 3, the downlink/uplink frames can be allocated in a structure contrary to the basic structure through switching between the groups. Namely, the downlink may be allocated the downlink/uplink frames in the order of group 2 and group 1 while the uplink may be allocated them in the order of group 1 and group 2.

Accordingly, if group switching is performed as above, types and the number of significant signals received by the group 1 H-FDD user equipment become those of significant signals received by the group 2 H-FDD user equipment, whereby fairness can be achieved. The H-FDD user equipment can note group switching that the group belonging to the H-FDD user equipment has been changed by group indicator transmitted from base station.

As described above, the IEEE 802.16m system should support both the F-FDD user equipment and the H-FDD user equipment. At this time, the frame structure for supporting the H-FDD user equipment can be configured using the F-FDD frame structure previously defined for the F-FDD user equipments. Since the F-FDD frame structure is configured in a subframe unit, the H-FDD frame structure for supporting the H-FDD user equipment can also be configured in a subframe unit. The H-FDD user equipments are grouped into two groups like the H-FDD user equipment of the existing legacy system, so that it can perform the H-FDD operation. Unlike the F-FDD user equipment, the H-FDD user equipments belonging to each group need a transition gap for downlink/uplink (DL/UL) switching in the H-FDD frame structure. Also, in order that the H-FDD frame structure maintains a frame alignment with the existing FDD frame structure in a line, the existing FDD frame structure needs to set a transition gap. To this end, a specific subframe may be allocated for an idle time or may be punctured.

Figure 4:
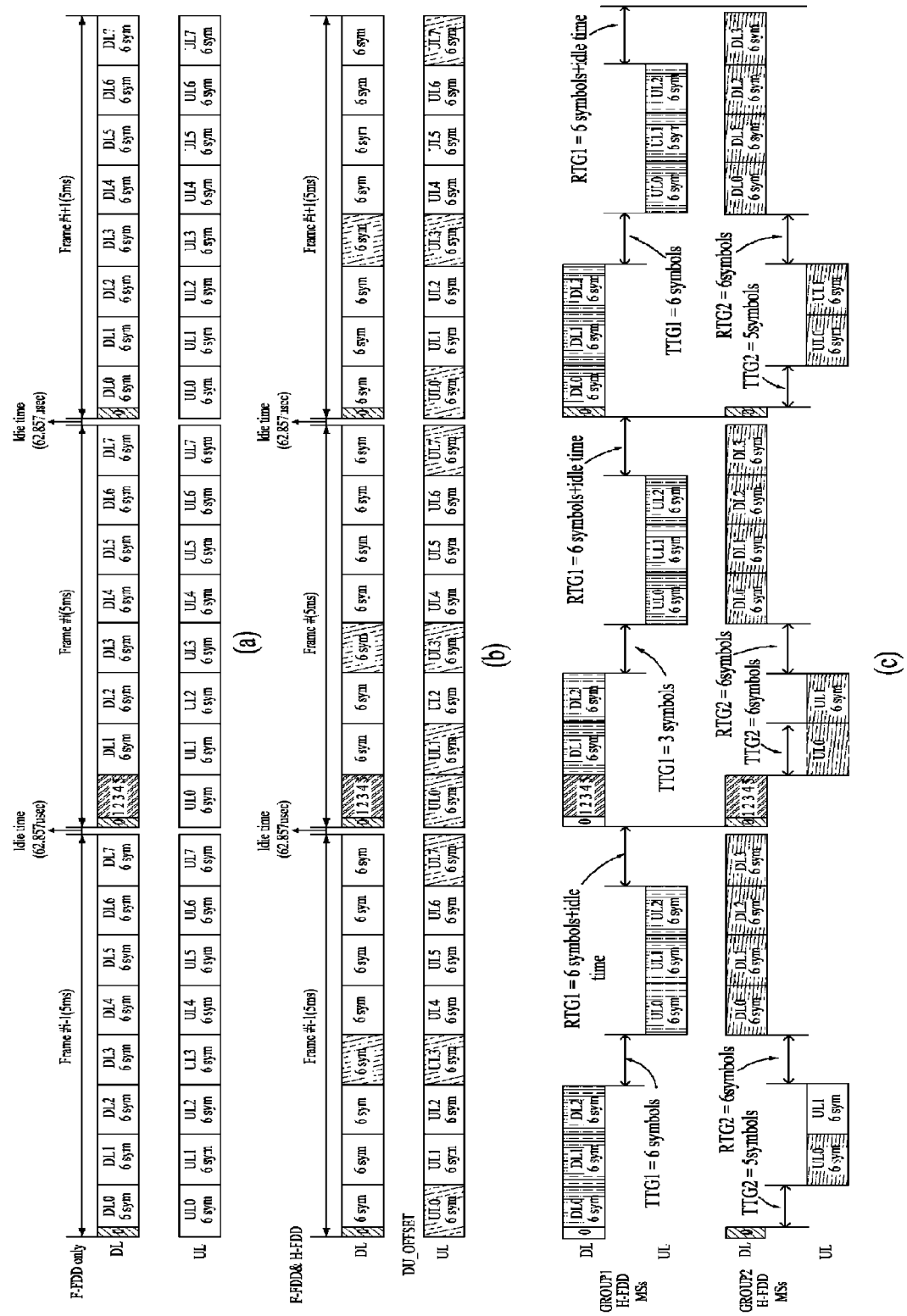
FIG. 4 is a diagram illustrating an example of an F-FDD frame structure, an FDD frame structure, and an H-FDD frame structure in an AAI system.

FIG. 4 is a diagram illustrating an example of an F-FDD frame structure, an FDD frame structure, and an H-FDD frame structure in an AAI system.

FIG. 4(a) illustrates an example of an F-FDD frame structure for a F-FDD user equipment, FIG. 4(b) illustrates an example of an F-FDD frame structure for an F-FDD user equipment and an H-FDD user equipment, and FIG. 4(c) illustrates an example of an H-FDD frame structure for an H-FDD user equipment.

As illustrated in FIG. 4(c), for downlink/uplink switching, H-FDD user equipments belonging to two groups in the H-FDD frame structure may allocate a subframe existing at the same location in the downlink and uplink zones to a transition gap or puncture the subframe as an idle frame. For example, for transmit transition gap (TTG) of the H-FDD user equipment belonging to group 1 and receive transition gap (RTG) belonging to group 2 in FIG. 4(c), the fourth subframe may be allocated to the gap zone and punctured in the downlink and uplink zones. In this case, the location of the subframe punctured for the transition gap of the H-FDD user equipments belonging to two groups is only exemplary, and is not limited to the fourth subframe.

The H-FDD frame structure can be configured by the transition gap through puncturing for the last uplink subframe of the uplink zone for RTG of the H-FDD user equipment belonging to the group 1. Since all the H-FDD user equipments belonging to each group should receive A-preamble and superframe header (SFH) transmitted from the base station, the uplink subframe existing at the same location as that of the subframe to which the A-preamble and the superframe header are transmitted through the downlink zone in the H-FDD frame structure may be punctured to be operated for the idle time.

Accordingly, the first uplink subframe existing at the same location as that of the subframe, to which the A-preamble or the superframe header is transmitted, in the uplink zone is punctured, and the H-FDD user equipment needs a transition gap to transmit data after receiving the superframe header at the frame to which the superframe header is transmitted. Considering such a transition gap, the second uplink subframe can be punctured in the uplink zone. In this way, at the frame where the H-FDD user equipments receive the superframe header, the first uplink subframe and the second uplink subframe of the uplink zone may be set to an idle time or may be punctured. The H-FDD frame is configured as above and then can maintain frame alignment with the F-FDD frame structure in a line.

In FIG. 4(c), if RTG of the H-FDD user equipment belonging to group 1 is smaller than or equal to the idle time, the last subframe of the uplink zone may not be punctured in the H-FDD frame structure. Accordingly, if the idle time is sufficient for a transition gap for switching from the uplink to the downlink, the H-FDD user equipments belonging to group 1 can use four subframes in the uplink zone for transmission of data, etc. The group 2 H-FDD user equipments can transmit data, etc. using the uplink subframe smaller than a frame, which does not receive a superframe header, by 1 considering the transition gap occurring as a superframe is received in a frame that receives a superframe header.

As illustrated in FIG. 4(c), although the group 2 H-FDD user equipment can transmit data, etc. using one uplink subframe (i.e., third uplink subframe) at the frame to which the superframe header is transmitted from the base station, it can transmit the data, etc. using two uplink subframes UL0 and UL1 at the frame to which the superframe header is not transmitted.

Alternatively, in order to maintain the number of available uplink subframes of the group 2 H-FDD user equipment at all the frames, the H-FDD frame structure can be configured in such a manner that the group 2 H-FDD user equipment does not use the second uplink subframe UL0.

If the transition gap (TTG/RTG) for downlink/uplink switching of the H-FDD user equipments belonging to each group is smaller than or equal to one symbol length, some symbols of the subframe punctured for the transition gap of two groups can be used. In other words, instead of puncturing the subframe for the transition gap, one symbol of the subframe where the gap is located is allocated to the gap, and then the subframe can be configured by the other symbols. For example, in FIG. 4(c), downlink subframe of five symbols may be allocated next to the third downlink subframe DL2 of the group 1. Alternatively, the downlink subframe constructed by five symbols may be allocated before the first downlink subframe DL0 of the group 2.

In order to support the H-FDD user equipment, only one group of the H-FDD frame structure for two groups illustrated in (c) of FIG. 4 can be used. For example, the H-FDD frame structure can only be used in FIG. 4(c). Accordingly, the H-FDD frame structure for supporting the H-FDD user equipment can be configured in the same manner as the frame structure of the group 1 in FIG. 4(c). At this time, for the transition gap, the fourth downlink subframe DL3 and the last uplink subframe U7 may be punctured. Accordingly, a ratio between the number of available downlink subframes and the number of available uplink subframes of the H-FDD user equipment becomes 3:3.

However, if the idle time of the FDD frame structure is great at a level that can cover RTG, the last uplink subframe does not needed to be punctured for the transition gap. At this time, the ratio between the number of available downlink subframes and the number of available uplink subframes of the H-FDD user equipment becomes 3:4. Accordingly, the ratio between the number of available downlink subframes and the number of available uplink subframes for the H-FDD user equipment may be varied depending on the location of the downlink subframe punctured for TTG and whether the last uplink subframe is punctured for RTG.

As illustrated in FIG. 4(c), if the H-FDD user equipment is supported using subframe puncturing, it does not affect the F-FDD user equipment. Accordingly, the F-FDD user equipment can transmit and receive data using all the subframes in the downlink/uplink like the F-FDD frame structure illustrated in FIG. 4(a). However, if one symbol is punctured in the downlink for the transition gap of the H-FDD user equipment, the F-FDD user equipment also needs to use the subframe constructed by five symbols, one of which is punctured, in the downlink zone. Accordingly, the base station can transmit indication information indicating puncturing for one symbol or frame configuration information to all the user equipments.

Figure 5:
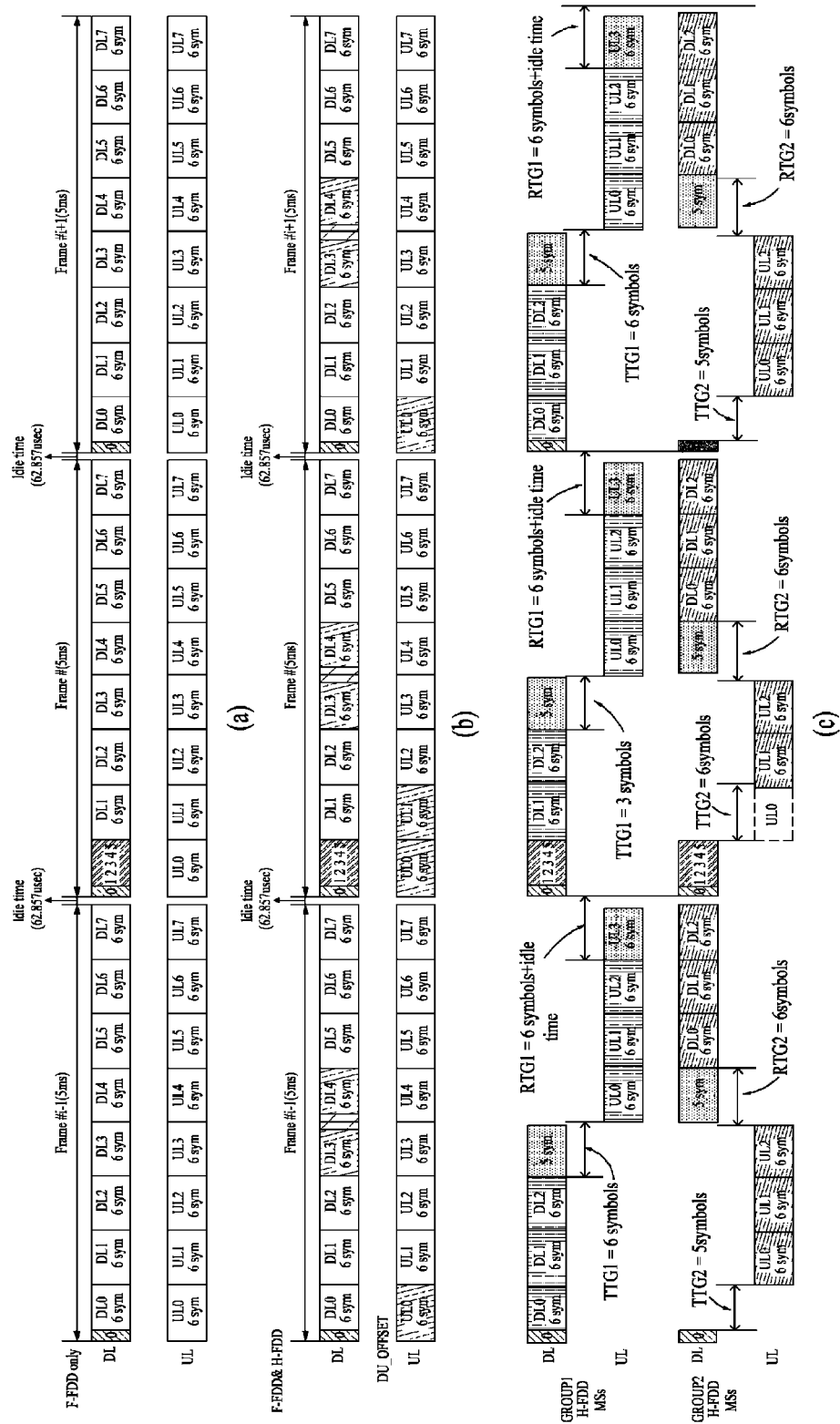
FIG. 5 is a diagram illustrating another example of an F-FDD frame structure, an FDD frame structure, and an H-FDD frame structure in an AAI system.

FIG. 5 is a diagram illustrating another example of an F-FDD frame structure, an FDD frame structure, and an H-FDD frame structure in an AAI system.

Referring to FIG. 5, FIG. 5(a) illustrates an example of an F-FDD frame structure for an F-FDD user equipment, FIG. 5(b) illustrates an example of an F-FDD frame structure for an F-FDD user equipment and an H-FDD user equipment, and FIG. 5(c) illustrates an example of an H-FDD frame structure for an H-FDD user equipment.

Unlike FIG. 4(c), the location of the transition gap for downlink/uplink switching of the H-FDD user equipments belonging to two groups can be varied depending on the H-FDD user equipments belonging to each group. The H-FDD frame structure for the user equipments belonging to group 1 may be configured in such a manner that the fourth downlink subframe DL3 in the downlink zone and the seventh subframe UL7 in the uplink zone for the transition gap are punctured as illustrated in FIG. 5(c). Also, the H-FDD frame structure for the user equipments belonging to group 2 may be configured in such a manner that the fifth downlink subframe DL4 is punctured for the transition gap.

In the FIG. 5(c), the H-FDD frame structure for the user equipments belonging to group 2 may be configured in such a manner that the first subframe UL0 of the uplink frame is punctured to receive the A-preamble or the superframe header transmitted from the first subframe of the downlink frame, and the second uplink subframe UL1 is additionally punctured considering the transition gap in the uplink frame to which the superframe header is transmitted.

Accordingly, in the H-FDD frame structure for the user equipments belonging to group 1, as illustrated in the FIG. 5(c), the downlink frame may include three subframes (first, second and third downlink subframes) and the uplink frame also includes three subframes (fifth, sixth, and seventh uplink subframes). At this time, if RTG of the group 1 is smaller than or equal to the idle time, the last uplink subframe may not be punctured. Accordingly, the uplink frame may include four subframes (fifth, sixth, seventh and eighth uplink subframes).

In the H-FDD frame structure for the user equipments belonging to group 2, considering the aforementioned subframe puncturing, the downlink frame includes three subframes (sixth, seventh and eighth downlink subframes) and the uplink frame to which the superframe header is transmitted includes two subframes (third and fourth uplink subframes). However, the uplink frame to which the A-preamble is transmitted instead of the superframe header may include three subframes (second, third and fourth uplink subframes).

Index of the subframes illustrated in FIG. 5(c) is configured using a subframe index of the F-FDD frame structure in FIG. 5(a). The index of the subframes may be varied for the H-FDD frame structure. The aforementioned H-FDD frame structure is only exemplary, and the H-FDD frame structure for supporting the H-FDD user equipment of each group can be varied depending on the location of the subframe punctured for the transition gap.

Instead of dividing the H-FDD user equipments into two groups, the H-FDD user equipment can be supported using only the H-FDD frame structure for one group of each H-FDD frame structure formed for the two groups illustrated in FIG. 5(c). Also, in order to equally maintain the number of uplink subframes on all the frames, the second uplink subframe UL0 may not be used on all the frames of the group 2.

Figure 6:
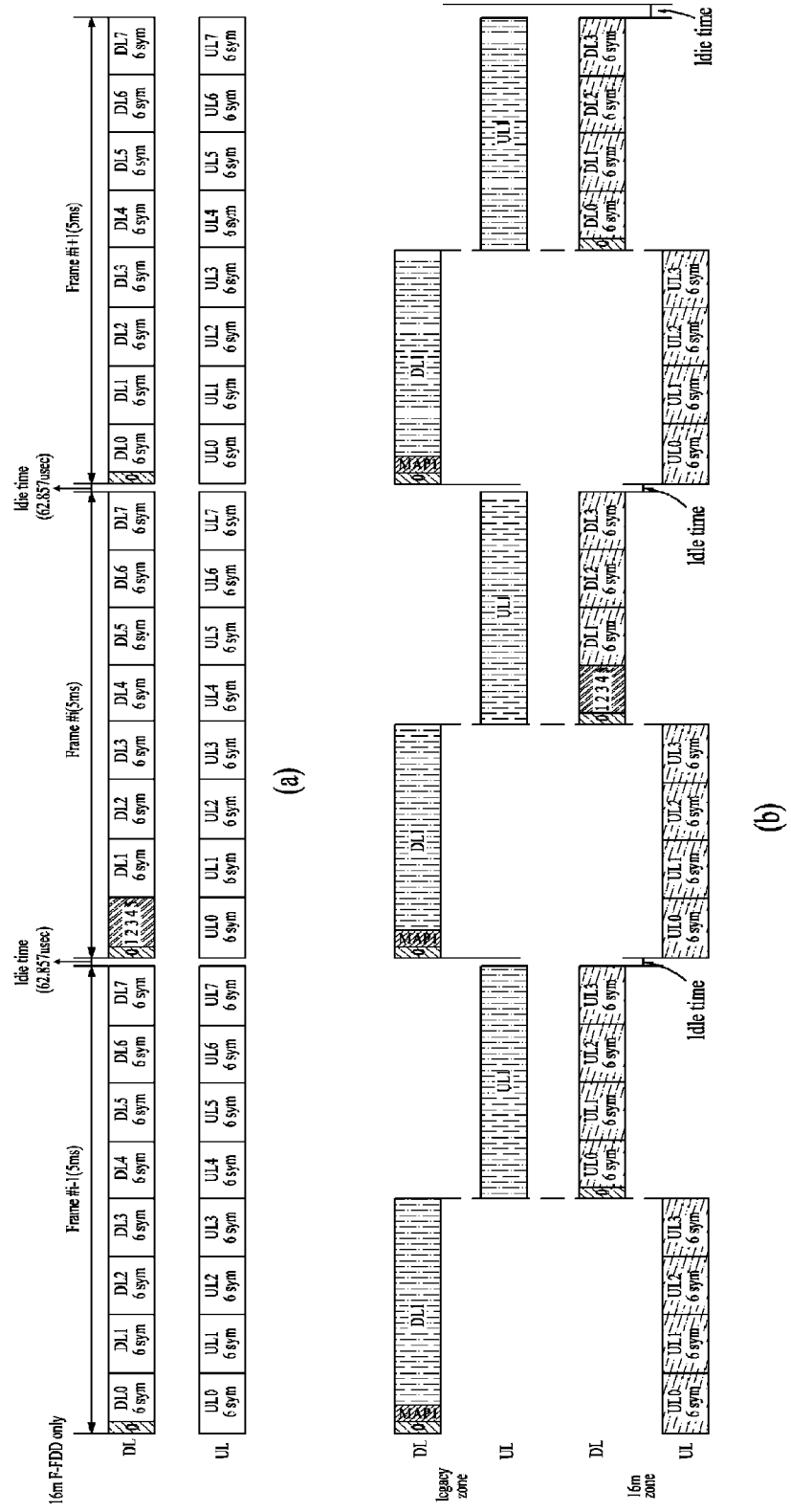
FIG. 6 is a diagram illustrating an example of an F-FDD frame structure in an AAI system.

FIG. 6 is a diagram illustrating an example of an F-FDD frame structure in an AAI system.

Referring to FIG. 6, FIG. 6(a) illustrates an example of an F-FDD frame structure for a 16 m F-FDD user equipment, and FIG. 6(b) illustrates an example of an F-FDD frame structure for supporting a 16 m H-FDD user equipment and a legacy H-FDD user equipment.

In the case that a legacy H-FDD user equipment exists, the FDD frame structure can be divided into two zones to support the legacy H-FDD user equipment and the 16 m FDD user equipment. In other words, the FDD frame structure can be divided into a legacy zone and a 16 m zone. At this time, the frame can be configured in such a manner that the legacy H-FDD user equipment is allocated to the legacy zone while the 16 m FDD user equipment is allocated to the 16 m zone. In this case, the sizes of the legacy zone and the 16 m zone allocated for the legacy H-FDD user equipment and the 16 m user equipment may be fixed or flexibly varied. Information of each of such zones can be indicated through signaling from the base station to the user equipment.

The 16 m FDD and 16 m H-FDD user equipments are used for the 16 m zone while the legacy H-FDD user equipment is used for the legacy zone. At this time, although the 16 m F-FDD user equipment can use all the resources of the 16 m zone, the 16 m H-FDD user equipment punctures the fourth subframe of the uplink to use it as the transition gap, whereby the 16 m H-FDD user equipment cannot use the fourth subframe to transmit signal(or data), etc. Also, if the idle time is smaller than RTG required for the 16 m H-FDD user equipment, the H-FDD frame structure can be configured in such a manner that the last downlink subframe DL3 for the transition gap is punctured.

Figure 7:
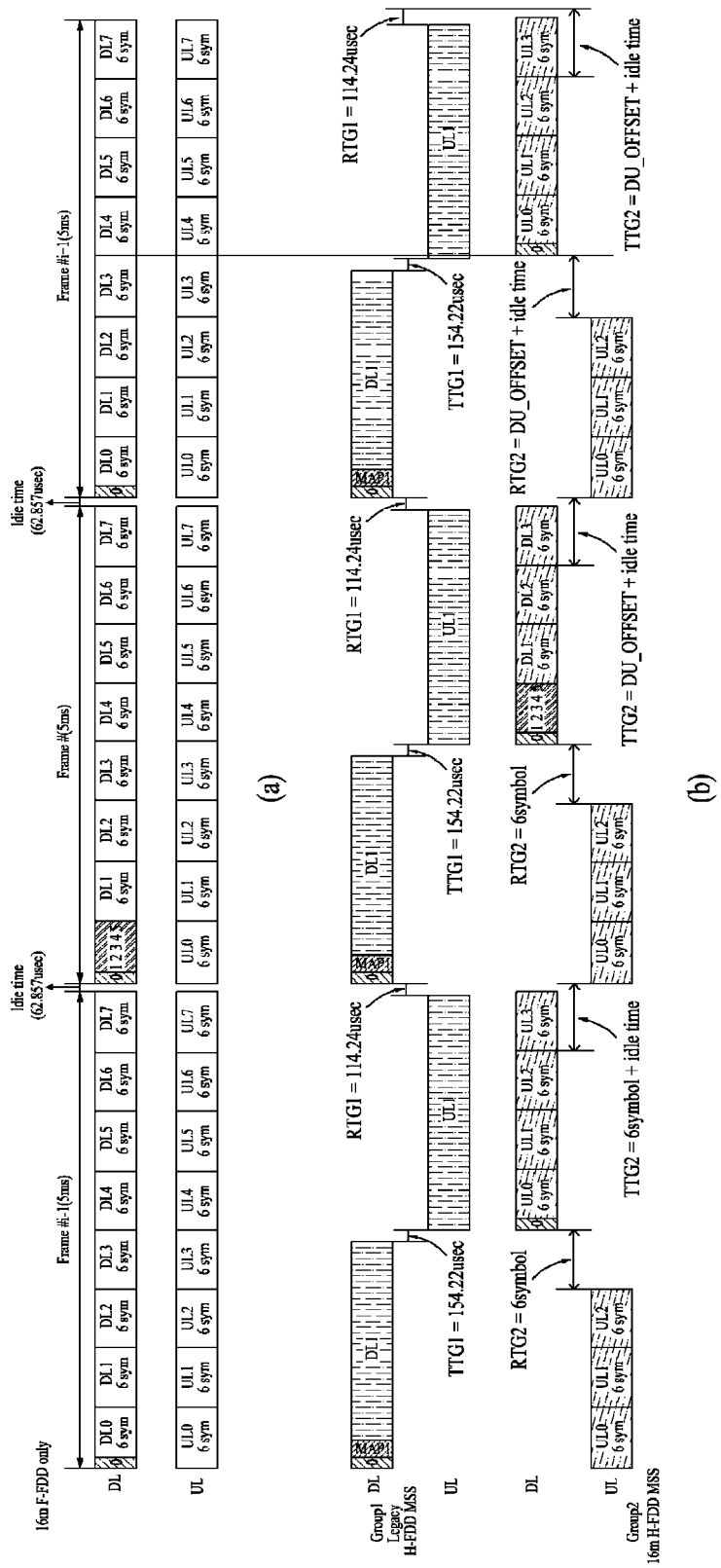
FIG. 7 is a diagram illustrating an example of an F-FDD frame structure and an H-FDD frame structure in an AAI system.

FIG. 7 is a diagram illustrating an example of an F-FDD frame structure and an H-FDD frame structure in an AAI system.

Referring to FIG. 7, FIG. 7(a) illustrates an example of an F-FDD frame structure for a 16 m F-FDD user equipment, FIG. 7(b) illustrates an example of an H-FDD frame structure for supporting a legacy H-FDD user equipment, and FIG. 7(c) illustrates an example of an H-FDD frame structure for a 16 m H-FDD user equipment.

For example, the number of downlink subframes allocated to the legacy zone for supporting the legacy user equipment need to be 3 or greater, and a time for downlink/uplink switching can be included in a predetermined subframe. Accordingly, the condition for a length of a downlink zone allocated to the legacy user equipment can be expressed as illustrated in Equation 1 below.

$$3 \times \text{subframe length} \leq \text{legacy downlink zone length} + TTG1$$

$$\text{Legacy downlink zone length} \leq 4 \times \text{subframe length} \quad \text{[Equation 1]}$$

The downlink zone for the legacy H-FDD user equipment satisfies the condition of the Equation 1 and can be allocated in a symbol unit. The uplink zone may be allocated with a gap with next frame as much as RTG1, or may be allocated within the location of the first to last uplink subframes in the F-FDD frame structure.

In the 16 m zone allocated for the 16 m F-FDD user equipment and the 16 m H-FDD user equipment, for downlink/uplink transition gap of the 16 m H-FDD user equipment, the H-FDD frame structure may be configured in such a manner that the fourth subframe uplink UL3 is punctured in the uplink zone and then used as the gap. Also, for TTG, the last downlink subframe may be punctured to be used as the transition gap. Accordingly, the last downlink subframe DL7 and the fourth uplink subframe UL3 may be punctured and allocated as transition gap for the 16 m H-FDD user equipment operated at the 16 m zone in the H-FDD frame structure. The aforementioned subframe index is illustrated based on the index in the F-FDD frame structure illustrated in FIG. 7(a).

Also, the H-FDD frame structure for supporting the H-FDD user equipment can be configured in such a manner that the downlink zone and the uplink zone of the legacy are controller appropriately so that the transition gap of the legacy H-FDD user equipment exists in the third subframe. This H-FDD frame structure may be configured in such a manner that the 16 m user equipment uses the first uplink subframe UL0 and the second uplink subframe UL1 at the 16 m zone, and the downlink starts after third uplink subframe is punctured.

If TTG of the 16 m zone allocated for the 16 m H-FDD user equipment is smaller than or equal to the idle time, the last downlink subframe DL7 may be punctured for the transition gap. In this case, the number of downlink subframes allocated for the 16 m FDD user equipment is 4 corresponding to the case where one subframe is more increased than the case where subframe puncturing is performed. At this time, the ratio between the number of downlink subframes and the number of uplink subframes becomes 4:3.

In the F-FDD frame structure illustrated in FIG. 7(a), since the 16 m F-FDD user equipment does not need a transition gap, it can use the subframes, i.e., the fifth, sixth, seventh, and eighth downlink subframes, of the other downlink zones except for the downlink zone allocated to the legacy H-FDD user equipment. Like the 16 m H-FDD user equipment, the 16 m F-FDD user equipment can use the first, second, and third subframes UL0, UL1 and UL2 in the uplink zone. However, if the uplink zone of the legacy does not use the fourth uplink subframe UL3 zone, unlike the 16 m H-FDD user equipment, the 16 m F-FDD user equipment can transmit data using the first, second third, and fourth uplink subframes UL0, UL1, UL2 and UL3. In this case, the base station can perform scheduling or provide signaling to the user equipment.

When the 16 m user equipment is supported using the aforementioned F-FDD frame structure, the H-FDD user equipment punctures several subframes for the transition gap at the subframes of each zone used by the F-FDD user equipment, so as to transmit data using the frame structure of the 16 m zone illustrated in FIG. 7.

As described above, in order to support the H-FDD user equipment, the H-FDD frame structure which is previously defined may be used. At this time, the respective user equipments can be divided into two groups, so that the uplink frame can be configured in the order contrary to the order of downlink frames allocated to each group. In the present invention, frame alignment is performed for the aforementioned frame structure in a line with the existing FDD frame structure, so as to support the H-FDD user equipment without affecting the user equipment that uses the existing FDD frame structure.

Furthermore, unlike the existing FDD frame structure, the H-FDD frame structure needs a switching period between downlink and uplink allocated to each group. Accordingly, an idle time for downlink/uplink switching need to be set in the downlink or uplink zone. At this time, the subframe allocated for downlink/uplink switching can be arranged at the same location in the downlink/uplink zones. Accordingly, a gap for switching can exist between the two groups, and the H-FDD frame structure aligned with the FDD frame structure having channel bandwidths of 5 MHz, 10 MHz, and 20 MHz can be configured.

Figure 8:
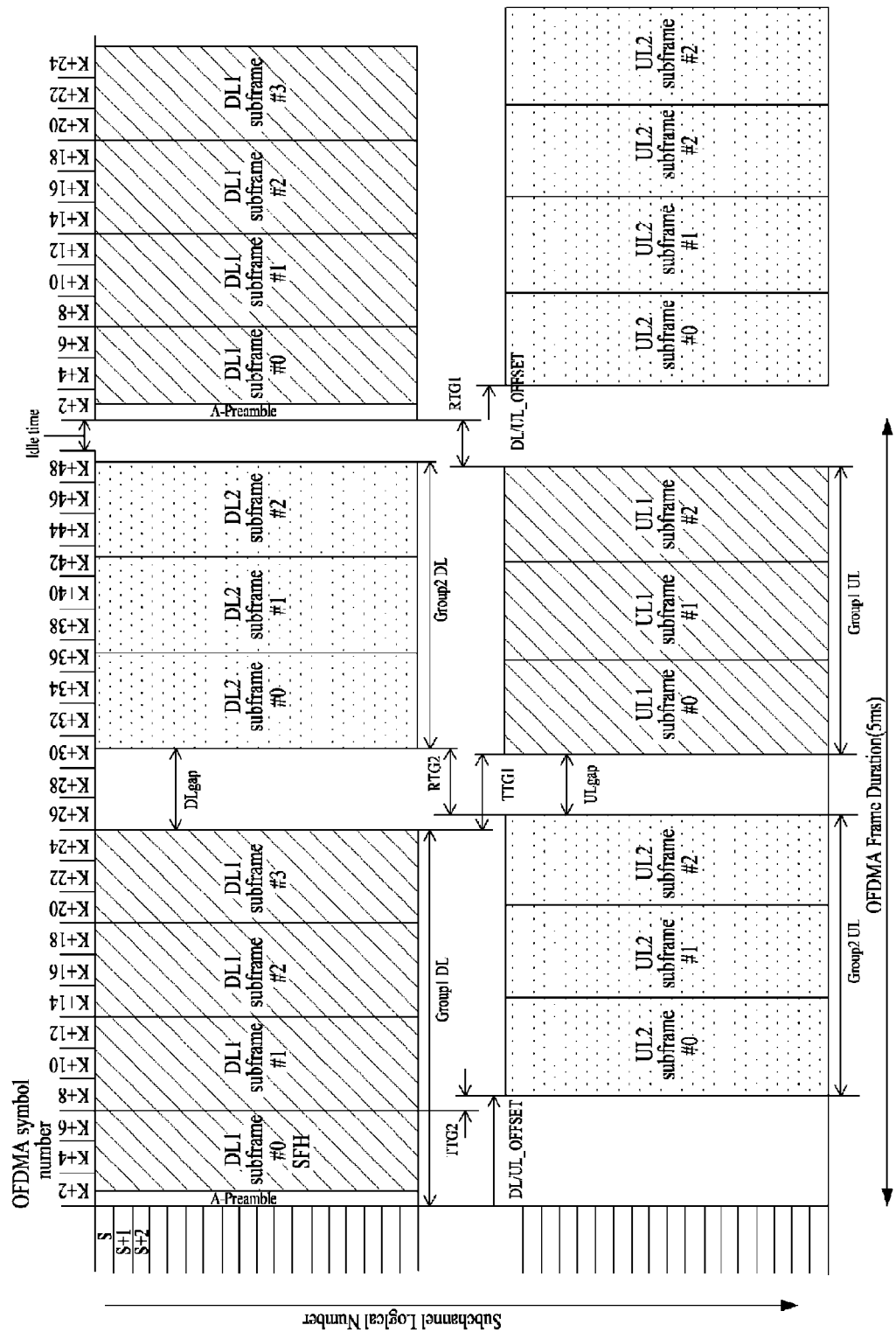
FIG. 8 is a diagram illustrating an example of an H-FDD frame structure having a CP length of ⅛ for channel bandwidths of 5 MHz, 10 MHz, and 20 MHz for supporting an H-FDD user equipment in an AAI system.

FIG. 8 is a diagram illustrating an example of an H-FDD frame structure having a CP length of ⅛ for channel bandwidths of 5 MHz, 10 MHz, and 20 MHz for supporting an H-FDD user equipment in an AAI system.

Since the FDD frame having channel bandwidths of 5 MHz, 10 MHz and 20 MHz includes a first type subframe that includes six OFDMA (orthogonal frequency division multiple access) symbols, the subframe allocated for the idle time is the first type subframe. In this case, the location of the subframe allocated or punctured for the idle time can be varied depending on the length of the zone allocated to the two groups. Accordingly, the location of the subframe illustrated in FIG. 8 is only exemplary, and there is no limitation in the location of the punctured subframe.

Since frame alignment is maintained in the same manner as the existing FDD frame structure to support the H-FDD user equipment, an impact on the user equipment that uses the existing IEEE 801.16m FDD frame structure can be minimized. As illustrated in FIG. 8, in order to support the H-FDD user equipment while maintaining frame alignment with the existing FDD frame structure, one subframe can be allocated from the downlink/uplink zones for the idle time for switching, i.e., downlink/uplink switching or uplink/downlink switching.

For example, in the FDD frame structure of eight first type subframes, one subframe existing between the downlink zones allocated to two groups can be used for the idle time. Accordingly, a gap DLgap equivalent to one subframe exists between the two groups at the downlink frame. As described above, since user equipments belonging to the two groups in the H-FDD frame structure should receive significant signals (for example, superframe header and A-preamble) transmitted from each frame, the frame period to which the significant signal is transmitted and the uplink frame period should not be overlapped with each other in the downlink zone as illustrated in FIG. 8. In other words, the uplink subframe at the same location as the subframe to which the aforementioned significant signal is transmitted is allocated as the idle subframe or punctured.

In the FDD frame structure of the existing IEEE 801.16m system, the superframe header is transmitted from the base station to the user equipment through the first subframe of the first frame. Since the H-FDD frame structure is based on the existing FDD frame structure, the superframe structure is transmitted in the same manner as the existing FDD frame structure. In order that all the user equipments receive the superframe header in the H-FDD frame structure, as illustrated in FIG. 8, the subframes of the frame duration to which the superframe header is transmitted are punctured or allocated for the idle time in the uplink zone, so that the subframes are not overlapped with each other.

For configuration of such frames, the user equipment can receive frame configuration information from the base station through the A-preamble, the superframe header, A-MAP, etc. The frame configuration information includes downlink/uplink offset (DL/UL_OFFSET) information, downlink/uplink allocation information (start point) information, subframe configuration information, information of the number of subframes, information of the order of subframes, downlink/uplink length information, group indicator information, TTG/RTG information, puncturing subframe information (for example, punctured subframe index, type, location), and idle time information (downlink/uplink gap).

The H-FDD user equipment which has received the frame configuration information from the base station can identify the information of the allocated downlink/uplink zones by using the frame configuration information. In this case, TTG and RTG values transmitted through the A-preamble, the superframe header, and the A-MAP could be constant values regardless of the frame. A value for configuring a frame structure for channel bandwidths of 5 MHz, 10 MHz and 20 MHz can be expressed as follows.

The range of values TTG1 and RTG1 corresponding to TTG and RTG of the group 1 can be expressed by the following Equation 2.

two symbol duration<$TG1+RTG1$≤first type subframe duration+idle time [Equation 2]

If DLgap is equal to the length of the subframe allocated for the switching period, the range can be expressed by the following Equation 3.

two symbol duration<$TG1+RTG1$=DLgap+idle time [Equation 3]

The range of values TTG2 and RTG2 corresponding to TTG and RTG of the group 2 can be expressed by the following Equation 4.

two symbol duration<$TTG2+RTG2$≤DLgap two symbol duration<$TTG2+RTG2$≤subframe duration punctured at downlink frame [Equation 4]

At this time, if supposing RTG2=ULgap, the range of the values TTG2 and RTG2 can be expressed by TTG2+RTG2=TTG2+ULgap. Also, the value of RTG2 can always have a value smaller than the value of TTG1.

In the H-FDD frame structure illustrated in FIG. 8, the H-FDD user equipment can identify the location of the start point of the allocated uplink frame by using the DL/UL_OFFSET information received from the base station. In this case, the DL/UL_OFFSET information value represents an offset value corresponding to an interval from a starting point of the downlink frame to a start point of the uplink frame. Accordingly, as the DL/UL_OFFSET is used in the aforementioned frame structure, idle or punctured subframes allocated by the H-FDD user equipment to perform transaction (i.e., downlink/uplink switching) after the significant signal is transmitted to the H-FDD user equipment through the downlink subframe may be reduced.

In this case, the DL/UL_OFFSET may be transmitted to each group, or may be transmitted to the group 2 only as illustrated in FIG. 8 to notify the corresponding user equipment of the start point of the uplink zone. When the DL/UL_OFFSET is transmitted to the group 2 only, the H-FDD user equipment of the group 1 can identify the start point of the uplink frame by using TTG1 or DLgap information. The DL/UL_OFFSET value for indicating the start point of the uplink frame may be set to the same value within the superframe or may be set to a different value per frame. In the case that the DL/UL_OFFSET value is set to the same value within the superframe, the DL/UL_OFFSET can be expressed by the following Equation 5.

DL/UL_OFFSET value≥first subframe duration punctured at uplink frame+$TTG2$ [Equation 5]

Also, in the case that the DL/UL_OFFSET value is set to a different value per frame, the first frame of the superframe should satisfy the condition illustrated in the Equation 5, and the range of the DL/UL_OFFSET value for the other frames can be expressed by the following Equation 6.

two symbol duration<DL/UL_OFFSET<first subframe duration punctured at uplink frame for DL/UL transaction [Equation 6]

In the case that different DL/UL_OFFSET values are not used for the respective frames, as illustrated in the first frame of FIG. 8, the frame may be configured in such a manner that the subframe matched with that of the downlink zone to which the significant signal is transmitted is allocated for an idle time or punctured in the uplink frame zone to receive the significant signals, i.e., A-preamble and superframe header.

Figure 9:
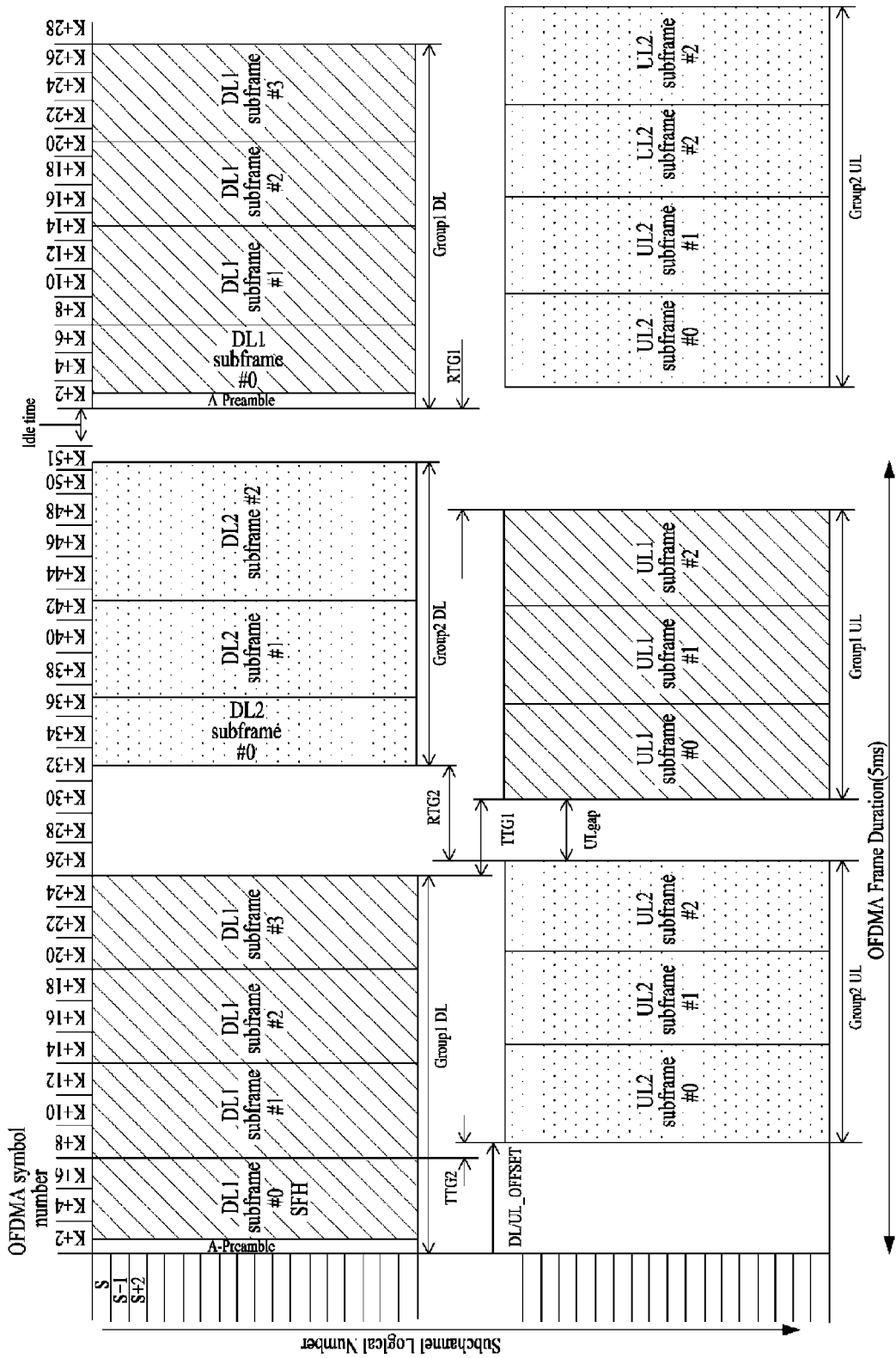
FIG. 9 is a diagram illustrating an example of an H-FDD frame structure having a CP length of 1/16 for channel bandwidths of 5 MHz, 10 MHz, and 20 MHz for supporting an H-FDD user equipment in an AAI system.

FIG. 9 is a diagram illustrating an example of an H-FDD frame structure having a CP length of $\frac{1}{16}$ for channel bandwidths of 5 MHz, 10 MHz, and 20 MHz to support an H-FDD user equipment in an AAI system.

The FDD frame structure having a $\frac{1}{16}$ CP length for channel bandwidths of 5 MHz, 10 MHz, and 20 MHz can include five first type subframes and three second type subframes. Accordingly, for downlink/uplink switching in the same manner as the aforementioned method, the H-FDD frame structure can be configured in such a manner that the first type subframe or the second type subframe is allocated for the idle time or punctured. In this case, it is preferable that the first type subframe is allocated to reduce waste of the frame. Also, in order that the H-FDD user equipment receives the significant signals, A-preamble and superframe header, transmitted from the downlink frame by the base station, the frame should be configured in such a manner that the frame duration to which the significant signals are transmitted should not be overlapped with the uplink frame duration. As described above, the subframe of the uplink frame duration corresponding to same timing with the downlink subframe duration that includes the superframe header, can be punctured. Likewise, the other frames existing at the superframe can be configured in such a manner that the first uplink subframe of the uplink frame is punctured. For transaction (i.e., downlink/uplink switching) of the H-FDD user equipment using the DL/UL_OFFSET, the second uplink subframe may not be allocated for an idle time or punctured but be used for data transmission and reception.

Figure 10:
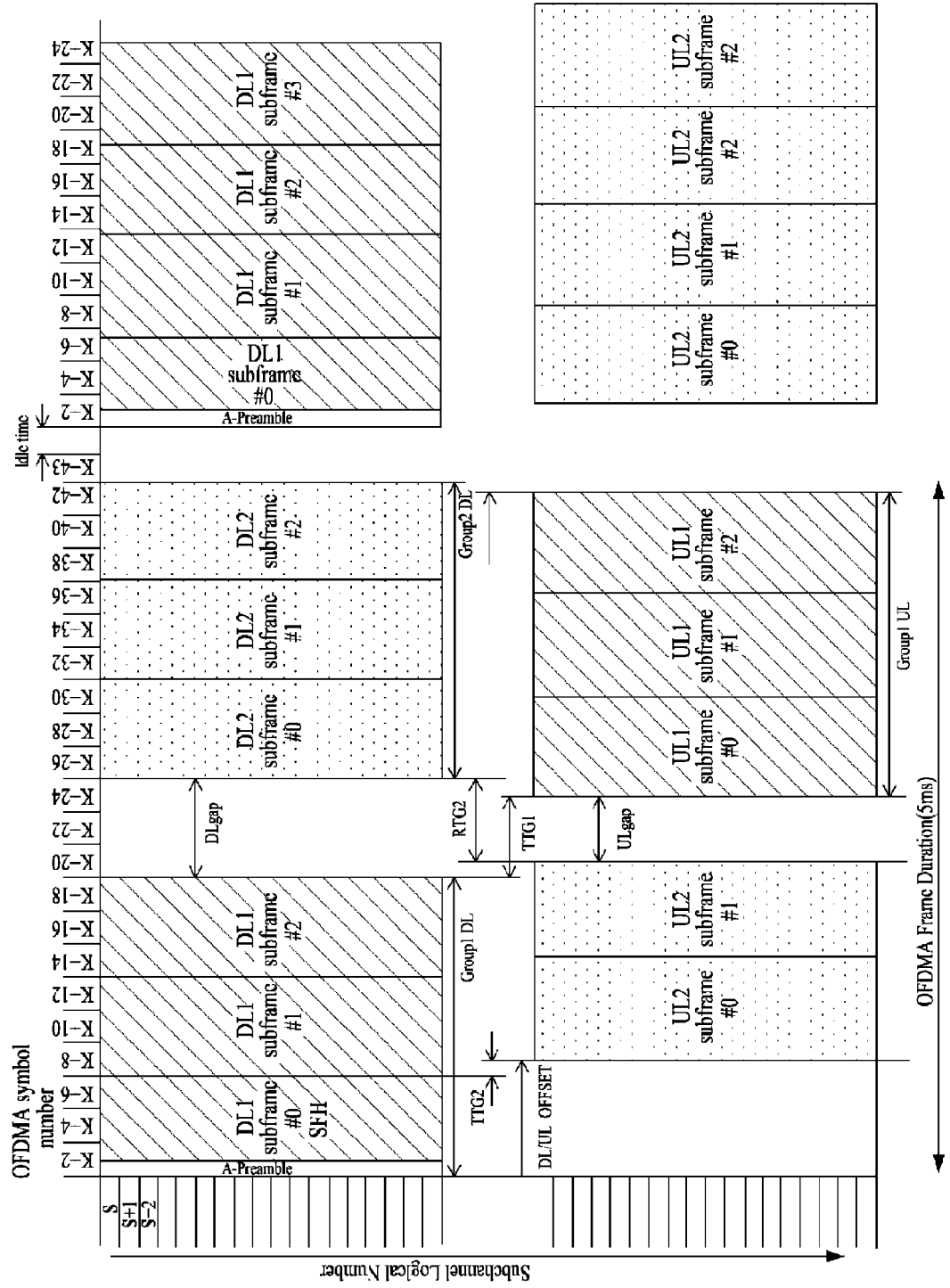
FIG. 10 is a diagram illustrating an example of an H-FDD frame structure having a CP length of ⅛ for a channel bandwidth of 8.75 MHz for supporting an H-FDD user equipment in an AAI system.

FIG. 10 is a diagram illustrating an example of an H-FDD frame structure having a CP length of $\frac{1}{8}$ having a channel bandwidth of 8.75 MHz to support an H-FDD user equipment in an AAI system.

The H-FDD structure having a $\frac{1}{8}$ CP length for a channel bandwidth of 8.75 MHz can support the H-FDD user equipment using the aforementioned structure. The FDD frame structure having a $\frac{1}{8}$ CP length for a channel bandwidth of 8.75 MHz can be configured by the first type subframe and the second type subframe. Accordingly, in the H-FDD frame structure, the subframe allocated as an idle subframe or punctured for downlink/uplink switching could be the first type of six symbols or the second type of seven symbols. In order to reduce waste of the frame in the H-FDD frame structure, it is preferable that the first type subframe is allocated for an idle time or punctured.

As illustrated in FIG. 10, in the H-FDD frame structure, one subframe may be allocated for downlink/uplink switching. In order that the H-FDD user equipment receives the significant signals, A-preamble and superframe header, the H-FDD frame structure can be configured in such a manner that the uplink subframe matched with the subframe duration to which the superframe header is transmitted is punctured. For transaction (i.e., downlink/uplink switching) of the H-FDD user equipment using the DL/UL_OFFSET, the second uplink subframe may not be allocated for an idle time or punctured. The type and location of the punctured subframe illustrated in FIG. 10 are only exemplary, and the type and location of the punctured subframe are not limited to the example of FIG. 10.

Figure 11:
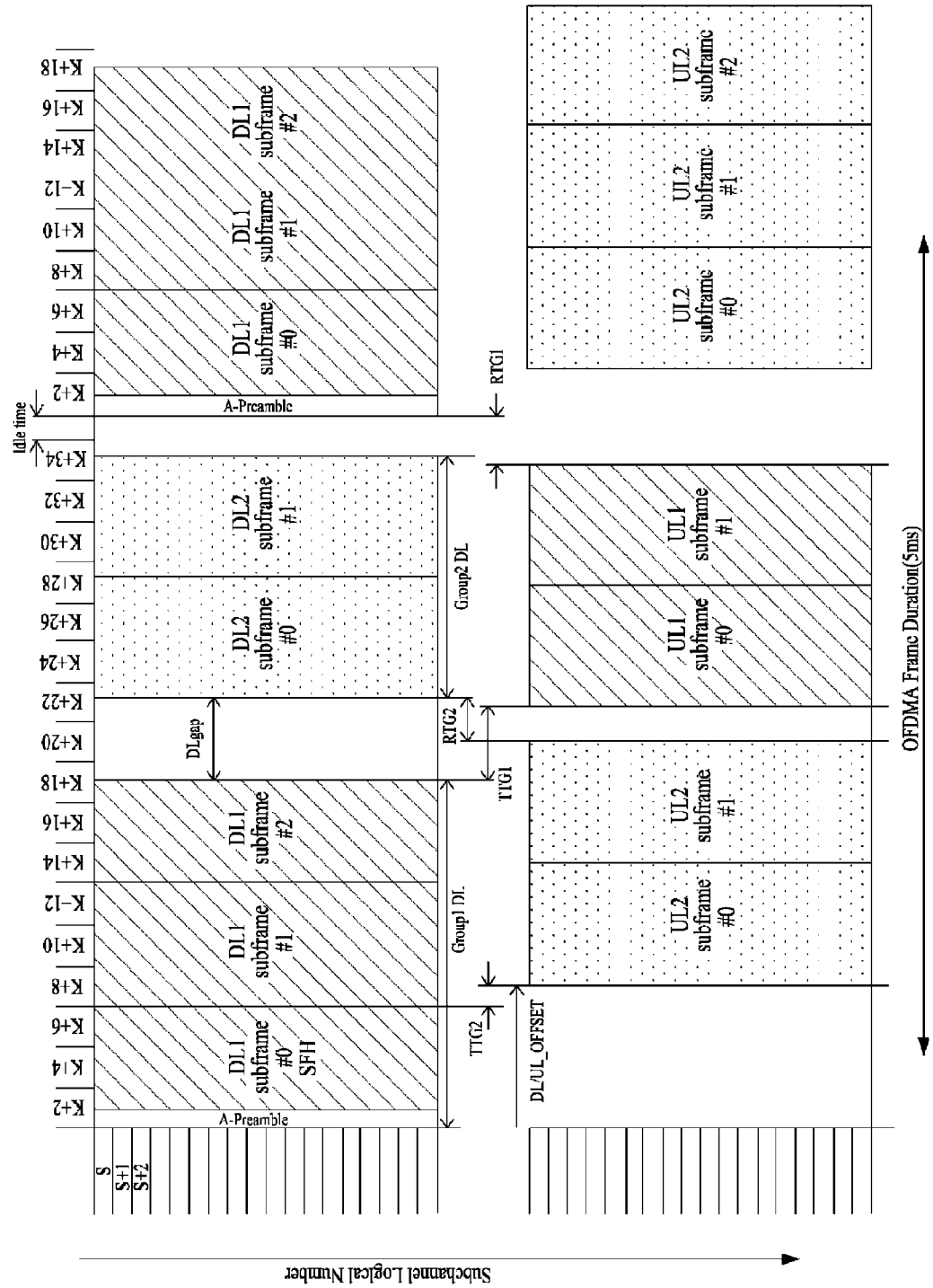
FIG. 11 is a diagram illustrating an example of an H-FDD frame structure having a CP length of ⅛ for a channel bandwidth of 7 MHz for supporting an H-FDD user equipment in an AAI system.

FIG. 11 is a diagram illustrating an example of an H-FDD frame structure having a CP length of $\frac{1}{8}$ for a channel bandwidth of 7 MHz to support an H-FDD user equipment in an AAI system.

The FDD structure having a $\frac{1}{18}$ length for a channel bandwidth of 7 MHz can include the first type subframe and the third type subframe. Accordingly, in the frame structure for a channel bandwidth of 7 MHz, in the case that the H-FDD frame structure is configured in the same manner as that of channel bandwidths 5/10/20 MHz and 8.75 MHz, the subframe allocated for an idle subframe or punctured is the first type subframe or the second type subframe. FIG. 11 illustrates the H-FDD frame structure for a channel bandwidth of 7 MHz. In this case, the location of the subframe allocated for the idle time or punctured is not limited to a specific location.

As described above, in order to support the H-FDD user equipment without impact on the full-FDD user equipment, the H-FDD structure can be configured using the existing FDD frame structure. The H-FDD frame structure needs the duration for switching of downlink/uplink allocated to each group, and needs to set the idle time for downlink/uplink (or uplink/downlink) switching in the downlink or uplink zone. At this time, the gap allocated to allocate the duration for downlink/uplink switching without impact on the F-FDD user equipment can be configured in a subframe unit. The subframe allocated for downlink/uplink switching can be set in the downlink zone or the uplink zone.

At this time, the gap for switching between the respective groups can exist in the downlink zone or the uplink zone depending on the location of the subframe allocated for the idle time or punctured. Accordingly, the gap for the switching duration exists between the respective groups, and the H-FDD frame structure aligned with the FDD frame structure for channel bandwidths of 5/10/20 MHz can be expressed as illustrated in FIG. 12 and FIG. 13 below.

Figure 12:
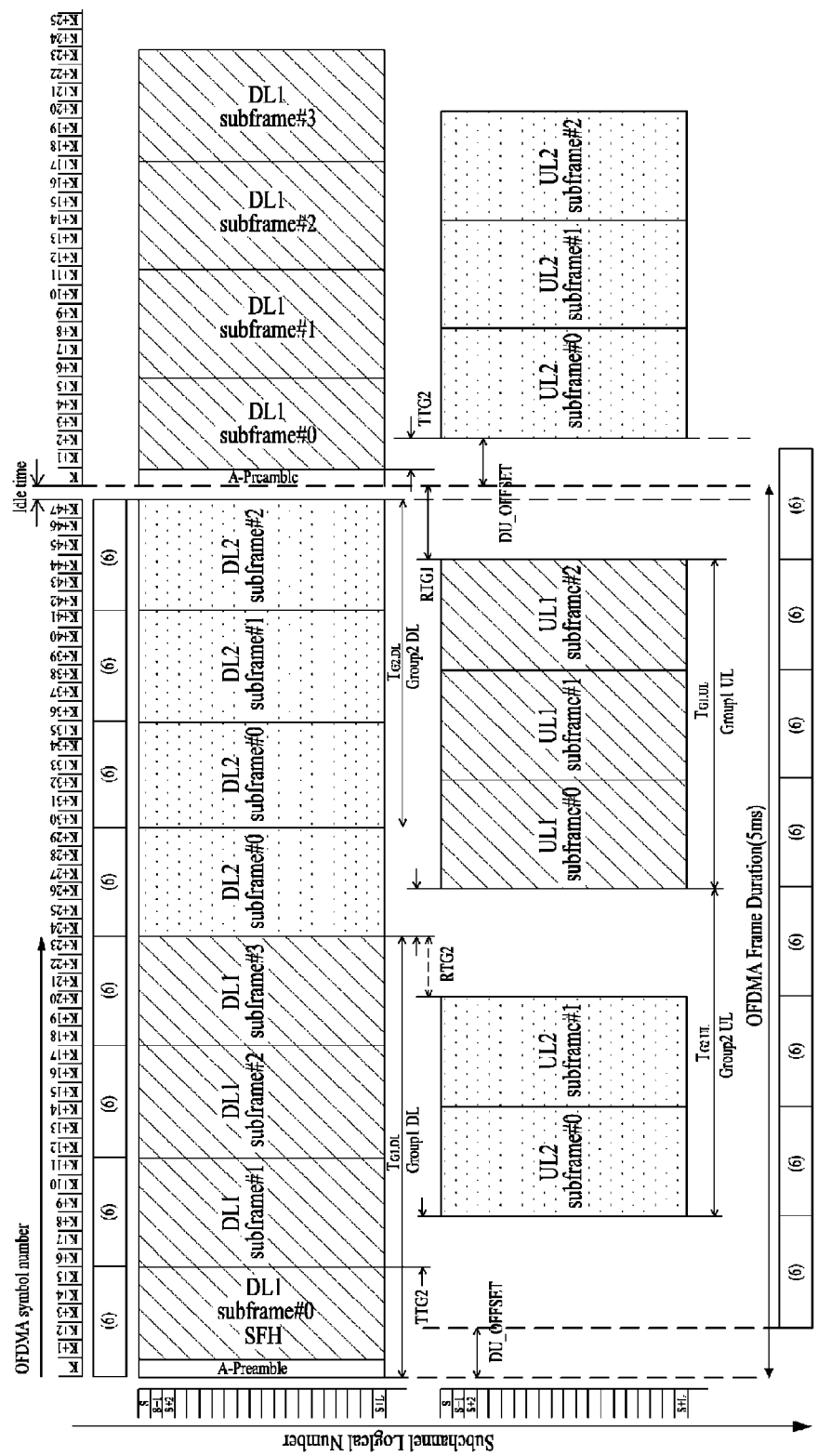
FIG. 12 and FIG. 13 are diagrams illustrating an example of an H-FDD frame structure having no DLgap and an example of an H-FDD frame structure having no ULgap in an AAI system.
Figure 13:
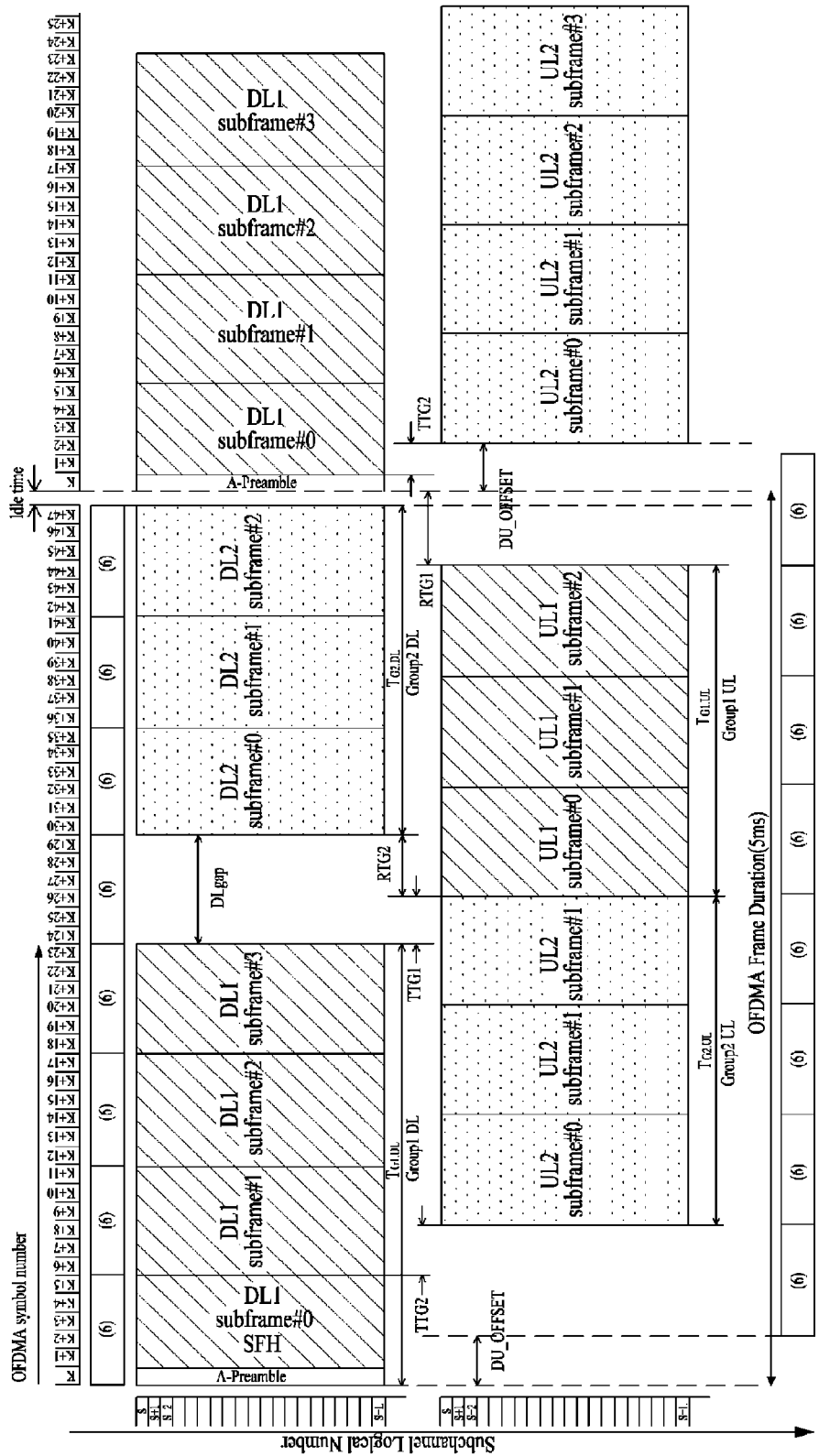

FIG. 12 and FIG. 13 are diagrams illustrating an example of an H-FDD frame structure having no DLgap and an example of an H-FDD frame structure having no ULgap in an AAI system, respectively.

Since the FDD frame for channel bandwidths of 5 MHz, 10 MHz and 20 MHz includes the first type subframe, the subframe allocated for the idle time is the first type subframe. At this time, the location of the subframe allocated for the idle time or punctured can be varied depending on the length of the zone allocated to the two groups. Accordingly, the location of the subframe punctured or allocated for the idle time in FIG. 12 and FIG. 13 is only exemplary and is not limited to the examples of FIG. 12 and FIG. 13.

As illustrated in FIG. 12, in order to set the gap for downlink/uplink switching of the H-FDD user equipments, the switching duration can be allocated in the uplink zone. Since the idle time for switching has been set in the uplink zone, no DLgap between the two groups exists in the downlink zone. The H-FDD frame structure for channel bandwidths of 5 MHz, 10 MHz and 20 MHz includes the first type subframe like the FDD frame structure and should maintain frame alignment. Accordingly, the number of subframes allocated for switching for the downlink and the uplink in the uplink zone needs at least two or greater considering reception of the significant signal of the H-FDD user equipment.

Contrary to the H-FDD frame structure illustrated in FIG. 12, in the H-FDD frame structure illustrated in FIG. 13, the subframe is allocated for the idle time in the downlink zone for the duration for downlink/uplink switching. In this case, no gap between two groups exists in the uplink zone. Also, for downlink/uplink switching, one subframe may be allocated for the idle time or punctured to each of the downlink zone and the uplink zone.

The H-FDD user equipment and/or the F-FDD user equipments can receive information of the subframe allocated for downlink/uplink switching from the base station through the superframe header or additional broadcasting information (ABI). At this time, the subframe configuration information corresponding to the information of the subframe allocated for downlink/uplink switching includes information of the number of subframes, location (or index) information of subframe, and zone information (downlink or uplink) of subframe allocated for downlink/uplink switching. In case of the F-FDD user equipment, since the H-FDD frame structure is not affected by the existing FDD frame structure, the F-FDD user equipment can transmit signal and data using the subframe allocated for the idle time or punctured.

As illustrated in FIG. 12 and FIG. 13, the 16 m H-FDD user equipment belonging to each group should receive the significant signals, such as the superframe header and A-preamble, which are transmitted from the base station. Accordingly, in order that the H-FDD user equipment receives such significant signals, no signal is transmitted from the uplink zone overlapped with the downlink zone (first subframe of the frame) to which the significant signals are transmitted. In other words, the overlapped duration can be set to the idle time. Accordingly, in order that the H-FDD user equipment receives such significant signals, the first subframe of the frame can be set to the idle time in the H-FDD frame structure. However, in the 16 m FDD frame structure, the A-preamble is transmitted from only the first subframe of the first frame within the superframe by the base station together with the superframe header, and the A-preamble is only transmitted from the first subframe of the other frames within the superframe.

However, it is not efficient in the frame structure that the first subframe of the frame is set to the idle time so that the H-FDD user equipment receives the significant signals. Accordingly, in order to reduce the idle time of the subframe, the DU_OFFSET value can be transmitted to the H-FDD user equipment so that the uplink can be used without puncturing of the first subframe. In this case, the DU_OFFSET value represents a timing offset value from the start point of the downlink frame to the start point of the uplink frame. At this time, the DU_OFFSET value can have a positive value or a negative value depending on the start point of the downlink frame to the start point of the uplink frame.

For example, if the start of the uplink frame is prior to the start of the downlink frame, the DU_OFFSET value has a negative value. Since the A-preamble is only transmitted from the other frames except for the first frame of the superframe, the idle time for receiving the preamble is set at the other frames except for the subframe overlapped with the first subframe of the superframe of the downlink in the uplink zone. Accordingly, if the DU_OFFSET value is set considering such an idle time, as illustrated in FIG. 12 and FIG. 13 for example, the base station sets the DU_OFFSET value to TTG2+one symbol duration to transmit the set value to the H-FDD user equipment through the superframe header or the additional broadcast information (ABI). The H-FDD user equipment which has received such a signal from the base station starts the uplink frame with a time difference equivalent to DU_OFFSET from the downlink frame. In this way, the DU_OFFSET value is controlled, the first subframe does not need to be set for the idle time or punctured at the other frames except for the first frame. Accordingly, there is an advantage in that the uplink zone can be used more efficiently. Also, since it does not affect the FDD frame structure that includes a subframe of six symbols, there is no impact on the existing F-FDD user equipment. At this time, the DU OFFSET value can be defined in various manners as expressed by the following Equation 7 and Equation 8.

$$DU\_OFFSET \geq TTG2 + PS\_1\text{Symbol}$$

$$DU\_OFFSET < \text{Symbols\_subframe} \times PS\_1\text{Symbol} - RTG2$$

$$DU\_OFFSET < \text{Symbols\_subframe} \times PS\_1\text{Symbol} + PS\_\text{Idle} - RTG1) \qquad \text{[Equation 7]}$$

In this case, PS__1Symbol denotes the number of PS per symbol, and Symbols_subframe denotes the number of symbols per subframe.

The above definition can be expressed by the following Equation 8 in a symbol level.

$$DU\_OFFSET \geq \text{ceil}(TTG2 + PS\_1\text{Symbol}, PS\_1\text{Symbol}),$$

$$DU\_OFFSET \leq \text{ceil}(\text{Symbols\_subframe} \times PS\_1\text{Symbol} - RTG2, PS\_1\text{Symbol}),$$

$$DU\_OFFSET \geq \text{ceil}(\text{Symbols\_subframe} \times PS\_1\text{Symbol} + PS\_\text{Idle} - RTG1, PS\_1\text{Symbol}) \qquad \text{[Equation 8]}$$

In this case, PS__1Symbol denotes the number of PS per symbol, Symbols_subframe denotes the number of symbols per subframe, and ceil denotes a function symbol obtaining the greatest integer closest to a decimal point.

Also, a timing parameter required for switching between the respective groups in the H-FDD frame structure can be defined as expressed by the following Equation 9.

$$RTG1 = \text{Symbols\_subframe} \times PS\_1\text{Symbol} + \text{Idle} - TTG1$$

$$RTG2 = \text{Symbols\_subframe} \times PS\_1\text{Symbol} - TTG2$$

$$TTG1 + RTG1 = \text{Symbols\_subframe} \times PS\_1\text{Symbol} + PS\_\text{Idle}$$

$$TTG2 + RTG2 = (\text{Symbols\_subframe} - 1) \times PS\_1\text{Symbol} \qquad \text{[Equation 9]}$$

In this case, TTG1≥α is obtained, wherein α denotes minimum TTG1 required for the frame, and TTG1 may not be varied per frame or may be transmitted as a superframe header message in a PS unit.

And, TTG2≥β is obtained, wherein β denotes minimum TTG2 required for the frame, and TTG2 may not be varied per frame or may be transmitted as a superframe header message in a PS unit.

PS__1Symbol denotes the number of PS per symbol, and Symbols_subframe denotes the number of symbols per subframe, wherein the number of symbols of the first type subframe is 6, the number of symbols of the second type subframe is 7, the number of symbols of the third type subframe is 5, and the number of symbols of the fourth type subframe is 9. And, PS_Idle=the number of PS per frame−Symbols_frame×PS__1Symbol.

Furthermore, the H-FDD user equipment can identify the start point of the uplink zone using the DU_OFFSET value received from the base station through the superframe header or the additional broadcast information. Moreover, the user equipments belonging to each group can identify the information of the allocated frame zone using another H-FDD frame parameters (for example, the number of subframes per group, configuration information, DLgap/ULgap, size of the gap, location of the gap, location (or index) of the punctured subframe, the number of punctured subframes, TTG1, TTG2, RTG1, and RTG2) received from the base station through the superframe header or the additional broadcast information (ABI).

If the transition gap is required in the H-FDD frame structure, the subframe can be punctured. The punctured subframe is not allocated to the H-FDD user equipment. Since the H-FDD user equipment should receive the superframe header and the preamble, the uplink subframe (for example, first uplink subframe) corresponding to the downlink subframe where the superframe header and the preamble exist can be punctured.

In the frame where the superframe header exists, next uplink subframe (for example, second uplink subframe) of the downlink subframe where the superframe header and the preamble exist can be punctured for the transition gap (the corresponding uplink subframe may not be punctured at the frame having no superframe header). Alternatively, to ensure the transition gap (in a symbol unit) at the subframe having a superframe header, for example, if seven OFDMA symbols are configured by the second type subframe, the corresponding next uplink subframe (for example, second uplink subframe) is not punctured but can be allocated for data transmission and reception. And, the last uplink subframe may be punctured for the transition gap.

For the aforementioned reason, the punctured subframe (subframe that cannot be allocated to the H-FDD user equipment) can exist at the uplink and/or the downlink for the H-FDD operation. The base station can perform scheduling for the H-FDD user equipment with the other resources except for the punctured uplink subframe. The H-FDD user equipment can be operated based on the same HARQ (Hybrid Automatic Repeat request) timing as that of the F-FDD frame structure except for the punctured subframe. In other words, the base station can perform scheduling for the H-FDD user equipment with the other resources except for the downlink subframe defined in the system considering the downlink subframe (processing time) corresponding to the uplink subframe based on the HARQ timing of the F-FDD and the punctured uplink subframe. If the downlink subframe is needed to be punctured, the uplink subframe corresponding to this downlink subframe can also be punctured.

When the base station performs scheduling for the H-FDD user equipment, considering TTG and RTG, the difference corresponding to at least 2 or greater may occur in the number of subframes of a random downlink subframe and a random uplink subframe allocated within the frame by one H-FDD user equipment. In other words, one or more subframes can be used for the transition gap during downlink to uplink transition or uplink to downlink transition (exception may be exist if the idle time is used for the RTG). As the subframes punctured at the uplink are minimized, flexibility of scheduling for the H-FDD user equipment can be maximized.

Figure 14:
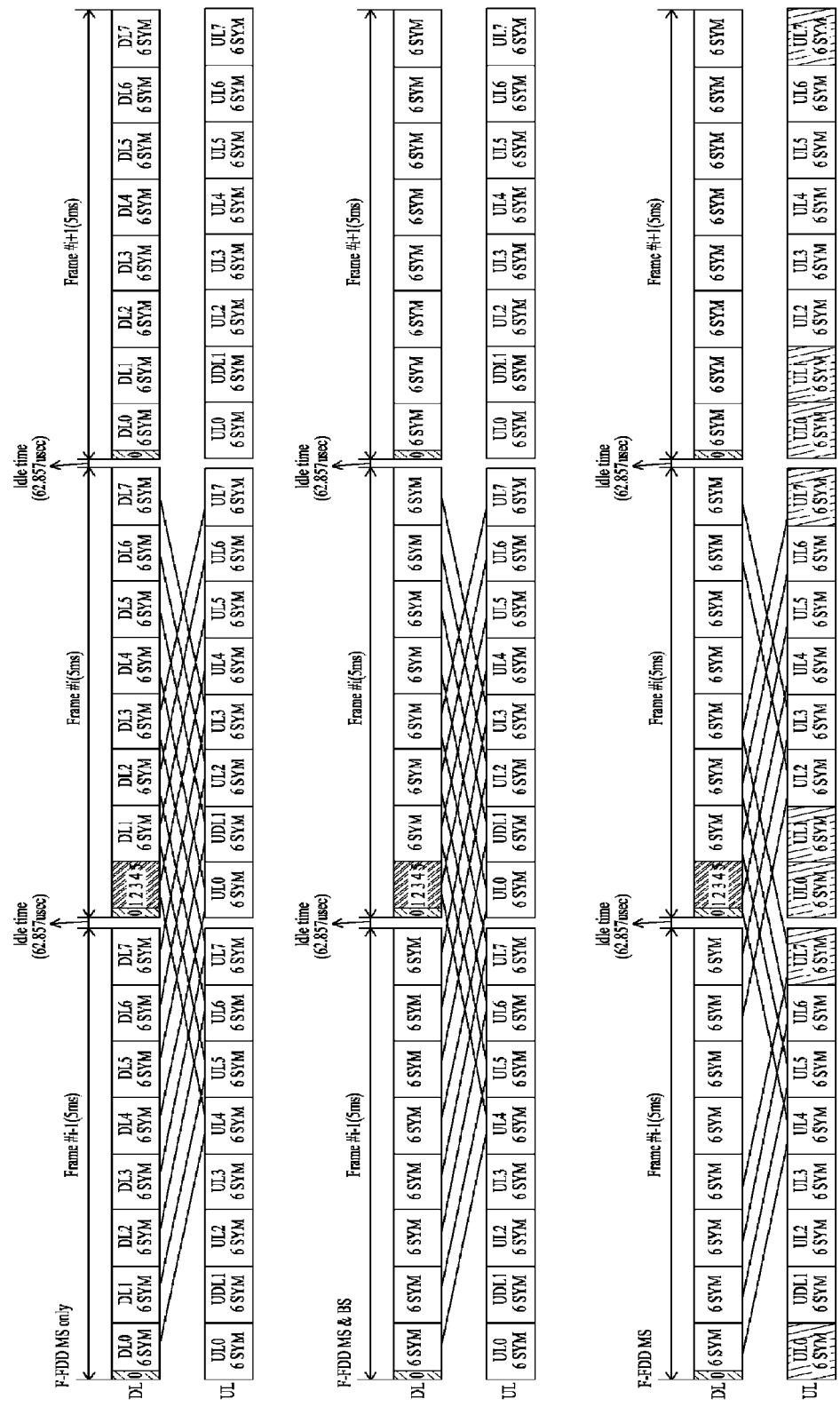
FIG. 14 is a diagram illustrating an example of an F-FDD frame structure, an FDD frame structure, and an H-FDD frame structure in an AAI system.

FIG. 14 is a diagram illustrating an example of an F-FDD frame structure, an FDD frame structure, and an H-FDD frame structure in an AAI system.

FIG. 14(a) illustrates an example of an F-FDD frame structure for an F-FDD user equipment, FIG. 14(b) illustrates an example of an F-FDD frame structure for an F-FDD user equipment and a base station, and FIG. 14(c) illustrates an example of an H-FDD frame structure for an H-FDD user equipment.

The first uplink subframe UL0 and the second uplink subframe UL1 may respectively be allocated to the superframe header, the preamble, and the transition gap based on the HARQ timing of the F-FDD. In other words, the first uplink subframe UL0 and the second uplink subframe UL1 are not allocated to the H-FDD user equipment. Accordingly, the fifth downlink subframe DL4 and the sixth downlink subframe DL5 corresponding to the first uplink subframe UL0 and the second uplink subframe UL1 are not allocated to the H-FDD user equipment either. However, if the superframe header does not exist, the second uplink subframe UL1 may be allocated to the H-FDD user equipment. The eighth uplink subframe UL7 can be set to the idle time for uplink to downlink switching. However, if RTG is sufficient for the idle time, the eighth uplink subframe UL7 and the fourth downlink subframe DL3 corresponding to the eighth uplink subframe UL7 may be allocated to the H-FDD user equipment. In this way, as the subframes punctured at the uplink are minimized, flexibility of scheduling for the H-FDD user equipment can be maximized.

Figure 15:
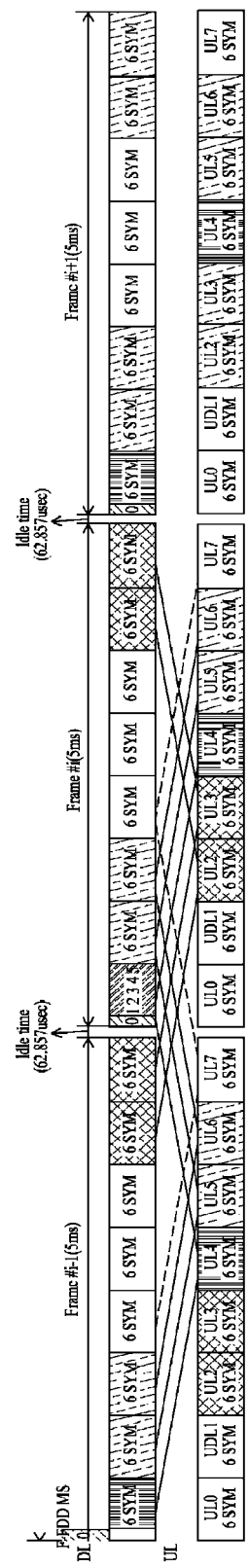
FIG. 15 is a diagram illustrating an example of an H-FDD frame structure in an AAI system.

FIG. 15 is a diagram illustrating an example of an H-FDD frame structure in an AAI system.

In another aspect of the embodiment of FIG. 14, grouping is not performed for the H-FDD user equipment of group 1 that includes DL0, DL1, DL2, (DL3), UL4, UL5, UL6, (UL7) and the H-FDD user equipment of group 2 that includes DL0, UL2, UL3, UL4, DL6, DL7, and resources can flexibly be allocated to the H-FDD user equipments through scheduling.

In other words, the first downlink subframe DL0 and the fifth uplink subframe UL4 corresponding to the first downlink subframe DL0 can always be used considering the HARQ timing, and two groups may exist based on puncturing of the subframe required for the transition gap of the H-FDD user equipment. Also, the base station can appropriately perform scheduling (or additional signaling (broadcast or unicast through message control channel, MAP) for each H-FDD user equipment considering the transition gap of the H-FDD user equipment based on all resources existing in the two groups. In this case, the subframe index is expressed using the subframe index of the F-FDD frame structure illustrated in FIG. 14(a). The index may be varied for the H-FDD frame structure.

As described above, considering both the H-FDD (Half-Frequency Division Duplex) scheme and the F-FDD (Full-Frequency Division Duplex) scheme, system throughput can be enhanced to the maximum range. At this time, system throughput can be limited by F-FDD throughput. In order that there is no impact on the F-FDD operation in view of throughput and signaling, it is not preferable that the F-FDD user equipment coexisting with the H-FDD user equipment is operated at lower throughput. Also, if the F-FDD user equipment coexists with the H-FDD user equipment, it is not preferable that the F-FDD frame structure is varied due to additional signaling. Moreover, in order that there is no impact on the uplink control channel, it is needed to design the frame structure having no third type subframe of five OFDMA symbols.

In order that there is no impact on the F-FDD operation, some of the subframes can be punctured for the H-FDD operation within the F-FDD frame structure used by the H-FDD user equipment. The H-FDD user equipment can be allocated with resources, which are not punctured, from the base station through scheduling.

Figure 16:
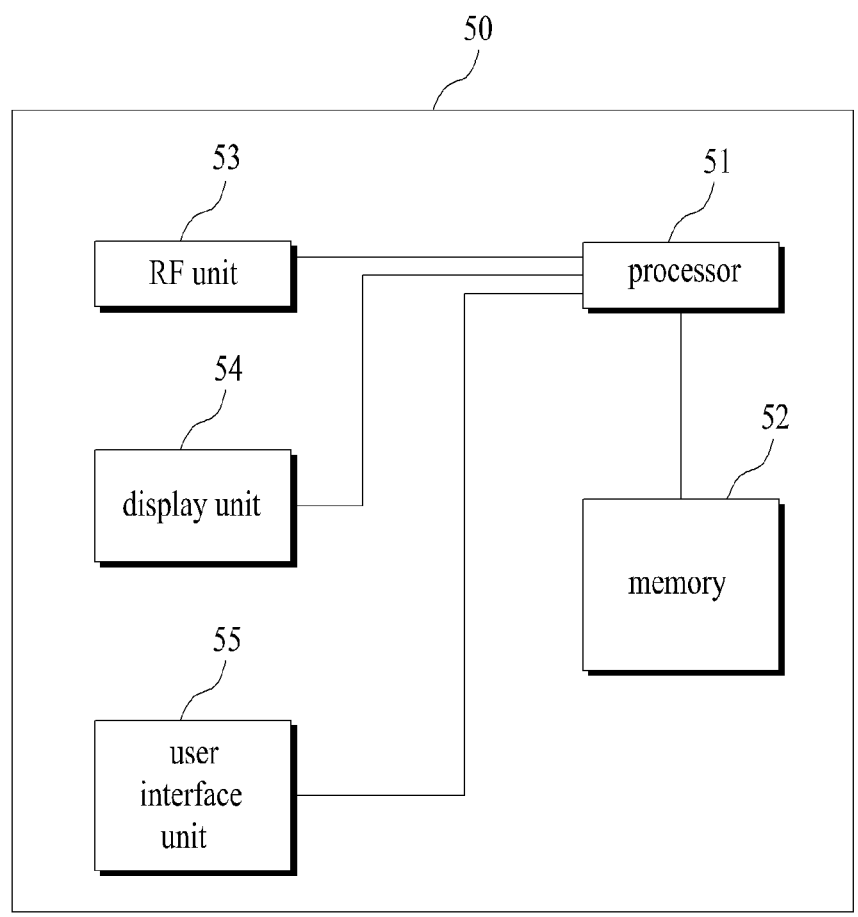
FIG. 16 is a diagram illustrating elements of a device 50.

FIG. 16 is a diagram illustrating elements of a device 50.

Referring to the device 50 may be a user equipment or a base station. Also, the device 50 includes a processor 51, a memory 52, a radio frequency (RF) unit 53, a display unit 54 and a user interface unit 55. Layers of a radio interface protocol are implemented within the processor 51. The processor 51 provides a control plane and a user plane. A function of each layer can be implemented within the processor 51. The processor 51 may include a contention resolution timer. The memory 52 is connected with the processor 51 and stores an operating system, an application program, and general files. If the device 50 is a user equipment (UE), the display unit 54 can display various kinds of information, and can be implemented using LCD (Liquid Crystal Display), OLED (Organic Light Emitting Diode), etc., which are known. The user interface unit 55 can be configured by combination of well known user interfaces such as key pad and touch screen. The RF unit 53 is connected with the processor 51 and transmits or receives a radio signal. The RF unit 53 includes a transmitting module (not shown) and a receiving module (not shown).

Layers of the radio interface protocol between the user equipment and the network can be divided into a first layer (L1), a second layer (L2) and a third layer (L3) based on three lower layers of an open system interconnection (OSI) model which is well known in the communication system. A physical layer (or PHY layer) belongs to the first layer, and provides an information transmission service through a physical channel. A radio resource control (RRC) layer belongs to the third layer and provides control radio resources between the UE and the network. The UE and the network exchange RRC messages through the RRC layer.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for performing a half-Frequency division duplex (H-FDD) operation at a H-FDD mobile station (H-FDD MS) using a FDD frame structure that supports the H-FDD operation in a mobile communication system, the method comprising:

receiving a superframe header (SFH) or a preamble from a base station (BS) through a first downlink subframe; and transmitting a signal through at least one uplink subframe, except for a first uplink subframe, a second uplink subframe and a last uplink subframe of a FDD frame, wherein the first uplink subframe, the second uplink subframe and the last uplink subframe of the FDD frame are configured as idle subframes for the H-FDD MS, wherein the first uplink subframe is located at a beginning of the FDD frame and is immediately followed by the second uplink subframe in the FDD frame, and wherein the first uplink subframe is aligned with the first downlink subframe in a time domain of the FDD frame.

2. The method of claim 1, wherein downlink subframes corresponding to a HARQ (Hybrid Automatic Repeat reQuest) timing of the first, second and last uplink subframes are further configured as the idle subframes for the H-FDD MS.

3. The method of claim 1, wherein a channel bandwidth of an uplink or a downlink frame is any one of 5 MHz, 10 MHz and 20 MHz and a cyclic prefix (CP) length is ⅛ of a useful symbol length.

4. The method of claim 3, wherein a ratio between the number of downlink subframes and the number of uplink subframes in a specific FDD frame is 4:4.

5. The method of claim 1, wherein the second uplink subframe and the last uplink subframe in the idle subframes comprises transition gaps between transmission and reception.

6. A method for performing a half-frequency division duplex (H-FDD) operation at a base station (BS) in a mobile communication system using a frequency division duplex (FDD) frame structure supporting the H-FDD operation, the method comprising:

transmitting a superframe header (SFH) or a preamble to a H-FDD mobile station (H-FDD MS) through a first downlink subframe; and scheduling at least one subframe, except for a first uplink subframe, a second uplink subframe and a last uplink subframe of a FDD frame, wherein the first uplink subframe, the second uplink subframe and the last uplink subframe of the FDD frame are configured as idle subframes for the H-FDD MS, wherein the first uplink subframe is located at a beginning of the FDD frame and is immediately followed by the second uplink subframe in the FDD frame, and wherein the first uplink subframe is aligned with the first downlink subframe in a time domain of the FDD frame.

7. The method of claim 6, wherein downlink subframes corresponding to a HARQ (Hybrid Automatic Repeat reQuest) timing of the first uplink subframe, the second uplink subframe, and the last uplink subframe are further configured as the idle subframes for the H-FDD MS.

8. The method of claim 7, further comprising:

transmitting data to the H-FDD MS through one or more other downlink subframes excluding the downlink subframes.

9. A half-frequency division duplex mobile station (H-FDD MS) for performing a HDD operation using a frequency division duplex (FDD) frame structure that supports the H-FDD operation in a mobile communication system, the H-FDD MS comprising:

a receiver;

a transmitter; and a processor, wherein the processor is configured to control the receiver to receive a superframe header (SFH) or a preamble from a base station (BS) through a first downlink subframe and the transmitter to transmit a signal through at least one uplink subframe, except for a first uplink subframe, a second uplink subframe and a last uplink subframe of a FDD frame, wherein the first uplink subframe, the second uplink subframe and the last uplink subframe of the FDD frame are configured as idle subframes for the H-FDD MS, wherein the first uplink subframe is located at a beginning of the FDD frame and is immediately followed by the second uplink subframe in the FDD frame, and wherein the first uplink subframe is aligned with the first downlink subframe in a time domain of the FDD frame.

10. The H-FDD MS of claim 9, wherein downlink subframes corresponding to a HARQ (Hybrid Automatic Repeat reQuest) timing of the first uplink subframe, the second uplink subframe and the last uplink subframe are further configured as the idle subframes for the H-FDD MS.

11. A base station (BS) for transmitting resource allocation information in a mobile communication system using a frequency division duplex (FDD) frame structure supporting a half-frequency division duplex (H-FDD) operation, the BS comprising:

a transmitter; and a processor, wherein the processor is configured to control the transmitter to transmit a superframe header (SFH) or a preamble to a H-FDD mobile station (H-FDD MS) through a first downlink subframe and schedule at least one subframe, except for a first uplink subframe, a second uplink subframe and a last uplink subframe of a FDD frame, wherein the first uplink subframe, the second uplink subframe and the last uplink subframe of the FDD frame are configured as idle subframes for the H-FDD MS, wherein the first uplink subframe is located at a beginning of the FDD frame and the first uplink subframe is immediately followed by the second uplink subframe in the FDD frame, and wherein the first uplink subframe is aligned with the first downlink subframe in a time domain of the FDD frame.

12. The BS of claim 11, wherein downlink subframes corresponding to a HARQ (Hybrid Automatic Repeat reQuest) timing of the first uplink subframe, the second uplink subframe and the last uplink subframe are further configured as the idle subframes for the H-FDD MS.

* * * * *